(12) United States Patent
Swager et al.

(10) Patent No.: US 10,738,157 B2
(45) Date of Patent: Aug. 11, 2020

(54) FUNCTIONALIZED TRIPTYCENE POLYMERS AND THEIR USES

(71) Applicant: Massachusetts Institute of Technology, Cambridge, MA (US)

(72) Inventors: Timothy M. Swager, Newton, MA (US); John B. Goods, Somerville, MA (US); Chuanhui L. Moh, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 397 days.

(21) Appl. No.: 15/215,410

(22) Filed: Jul. 20, 2016

(65) Prior Publication Data

US 2017/0022323 A1    Jan. 26, 2017

Related U.S. Application Data

(60) Provisional application No. 62/307,264, filed on Mar. 11, 2016, provisional application No. 62/194,740, filed on Jul. 20, 2015.

(51) Int. Cl.

| | |
|---|---|
| *C08G 65/48* | (2006.01) |
| *C08G 65/40* | (2006.01) |
| *B01J 39/19* | (2017.01) |
| *B01J 41/13* | (2017.01) |
| *B01J 47/12* | (2017.01) |
| *C08J 5/22* | (2006.01) |
| *C08L 71/00* | (2006.01) |
| *H01M 8/1025* | (2016.01) |
| *H01M 8/04082* | (2016.01) |
| *H01M 8/1018* | (2016.01) |

(52) U.S. Cl.
CPC .............. *C08G 65/48* (2013.01); *B01J 39/19* (2017.01); *B01J 41/13* (2017.01); *B01J 47/12* (2013.01); *C08G 65/4006* (2013.01); *C08G 65/4012* (2013.01); *C08J 5/2256* (2013.01); *C08L 71/00* (2013.01); *H01M 8/1025* (2013.01); *C08J 2371/10* (2013.01); *C08L 2205/025* (2013.01); *H01M 8/04197* (2016.02); *H01M 2008/1095* (2013.01)

(58) Field of Classification Search
None
See application file for complete search history.

(56) References Cited

U.S. PATENT DOCUMENTS

| | | | |
|---|---|---|---|
| 2007/0117954 A1 | 5/2007 | Swager et al. | |
| 2010/0152409 A1 | 6/2010 | Chen et al. | |
| 2011/0195255 A1* | 8/2011 | Kim ....................... | C08J 5/2256 428/412 |
| 2015/0191408 A1 | 7/2015 | Turner et al. | |

FOREIGN PATENT DOCUMENTS

| | | |
|---|---|---|
| EP | 0 581 058 A1 * | 2/1994 |
| WO | WO 2015/035243 A1 * | 3/2015 |

OTHER PUBLICATIONS

Gong et al ("Synthesis of Highly Sulfonated Poly(arylene ether sulfone)s with Sulfonated Triptycene Pendants for Proton Exchange Membranes", Polymer, vol. 52 (2011), p. 1738-1747. (Year: 2011).*
Derwent English abstract for EP 0 581 058 A1. (Year: 1994).*
International Search Report and Written Opinion for PCT/US2016/043085 dated Sep. 22, 2016.
[No Author Listed], Victrex announces new plant for early 2015—Substantially boosts production capacity for VICTREX™ PAEK polymers. https://www.victrex.com/en/news/2012/10/victrex-announces-new-plant-for -early-2015, Nov. 14, 2012. 3 pages.
Bailly et al., The sodium salts of sulphonated poly(aryl-ether-ether-ketone) (PEEK): Preparation and characterization. Polymer. May 1987:28(6):1009-16.
Cheng et al., A mini-review on anion exchange membranes for fuel cell applications: Stability issue and addressing strategies. Intl J Hydrogen Energy. Jun. 22, 2015;40(23):7348-60. doi: 10/1016/j.ijhydene.2015.04.040. E pub May 4, 2015.
Conceicao et al., Preparation and characterization of poly(ether ether ketone) derivatives. J Braz Chem Soc. 2008;19(1):111-6.
Cox et al., Interrupted energy transfer: highly selective detection of cyclic ketones in the vapor phase. J Am Chem Soc. Aug. 24, 2011;133(33):12910-3. doi: 10.1021/ja202277h. Epub Aug. 2, 2011.
Do et al., Synthesis and characterization of homogeneously sulfonated poly(ether ether ketone) membranes: Effect of casting solvent. J Appl Polym Sci. Nov. 5, 2008;110(3):1763-70. Epub Jul. 30, 2008.
Doyle et al., Small-molecule H-bond donors in asymmetric catalysis. Chem Rev. Dec. 2007;107(12):5713-43.
Etter et al., Hydrogen bond directed cocrystallization and molecular recognition properties of diarylureas. J Am Chem Soc. 1990;112(23):8415-26.

(Continued)

*Primary Examiner* — Sin J Lee
(74) *Attorney, Agent, or Firm* — Wolf, Greenfield & Sacks, P.C.

(57) ABSTRACT

Embodiments described herein relate to compositions including iptycene-based structures. Some embodiments provide compositions including polymers having a backbone comprising an iptycene-based compound. Some embodiments described herein provide compositions having enhanced properties such as enhanced porosity, increased glass transition temperatures, and/or improved solubility as compared to traditional poly(aryl ether)-based compounds or traditional iptycene-based compounds. In some cases, the compositions may include various aryl ether compounds such as an aryl ether ketone incorporated into the polymer backbone. Non-limiting examples of suitable aryl ether compounds include polyaylethersulfones, polyaryletherketones, polyetherimides, and polyphenylene ethers. The compositions described herein may be useful in a wide variety of applications, including structural materials, flexible composites, ion conductors, fuel cell membranes such as proton exchanging membranes, sensors, preconcentrators, absorbents, or the like.

24 Claims, 29 Drawing Sheets

(56) References Cited

OTHER PUBLICATIONS

Frazier et al., Robust cyclohexanone selective chemiresistors based on single-walled carbon nanotubes. Anal Chem. Aug. 6, 2013;85(15):7154-8. doi: 10.1021/ac400808h. Epub Jul. 25, 2013.

Goods, Design and Synthesis of Functional Graphenic and Triptycene Poly(arylether) Materials. Ph.D Thesis, Department of Chemistry, Massachusetts Institute of Technology. Jun. 2015. 236 pages, submitted in 3 parts.

Gu et al., Self-crosslinking for dimensionally stable and solvent-resistant quaternary phosphonium based hydroxide exchange membranes. Chem Commun (Camb). Mar. 14, 2011;47(10):2856-8. doi: 10.1039/c0cc04335d. Epub Jan. 20, 2011.

Guen et al., Synthesis and properties of flexible poly(ether ketone) backbones, grafted with stiff, monodisperse side chains. Macromolecules. 1998; 31(19): 6559-65. Epub Aug. 27, 1998.

Hart, Iptycenes, cuppendophanes and cappedophanes. Pure and Appl Chem. 1993;65(1):27-34.

Iulianelli et al., Sulfonated PEEK-based polymers in PEMFC and DMFC applications: A review. Intl J Hydrogen Energy. Oct. 2012;37(20):15241-55. Epub Aug. 18, 2012.

Intaraprasit et al., Preparation and properties of sulfonated poly (ether ether ketone)/Analcime composite membrane for a proton exchange membrane fuel cell (PEMFC). J Taiwan Inst Chem Eng. 2011;42(1):190-5.

Karcha et al., Preparation and characterization of nitrated poly(aryl ether ketone). JMS-Pure Appl Chem. 1995;A32(5):957-67.

Lakshmi, et al., Sulphonated poly(ether ether ketone): Synthesis and characterisation. J Mater Sci. Feb. 2005;40(3):629-36.

Litt et al., Poly(arylenesulfonic acids) with frozen-in free volume as hydrogen fuel cell membrane materials. Polym Rev. 2015;55(2):307-29. Epub May 7, 2015.

Long et al., Molecular design of free volume as a route to low-kappa dielectric materials. J Am Chem Soc. Nov. 19, 2003;125(46):14113-9. Epub Oct. 17, 2003.

Mauritz et al, State of understanding of nafion. Chem Rev. Oct. 2004;104(10):4535-85. Epub Sep. 21, 2004.

Maurya et al., A review on recent developments of anion exchange membranes for fuel cells and redox flow batteries. RSC Adv. 2015;5(47):37206-30. doi: 10.1039/c5ra04741b. Epub Apr. 13, 2015.

Merle et al., Anion exchange membranes for alkaline fuel cells: A review. J Membr Sci. 2011;377(1-2):1-35, doi:10.1016/j.memsci. 2011.04.043. Epub Apr. 30, 2011.

Peighambardoust et al., Review of the proton exchange membranes for fuel cell applications. Intl J Hydrogen Energy. Sep. 2010;35(17):9349-84. Epub Jun. 19, 2010.

Rifai et al., Facile in situ silver nanoparticle formation in insulating porous polymer matrices. Chem Mater. 2006;18(1):21-5. Epub Dec. 13, 2005.

Righettoni et al., Si:$WO_3$ Sensors for highly selective detection of acetone for easy diagnosis of diabetes by breath analysis. Anal Chem. May 1, 2010;82(9):3581-7. doi: 10.1021/ac902695n. Epub Apr. 12, 2010.

Schreiner. Metal-free organocatalysis through explicit hydrogen bonding interactions. Chem Soc Rev. Sep. 2003;32(5):289-96. Epub Jun. 12, 2003.

Sengul et al., Effects of sulfonated polyether-etherketone (SPEEK) and composite membranes on the proton exchange membrane fuel cell (PEMFC) performance. Intl J Hydrogen Energy. May 2009;34(10):4645-52. Epub Nov. 5, 2008.

Shahlia et all, Synthesis of supertriptycene and two related iptycenes. J Org Chem. 1991;56(24):6905-12.

Shibuya et al., Kinetics of PEEK sulfonation in concentrated sulfuric acid. Macromolecules. Nov. 1992;25(24):6495-9.

Shukla et al., Synthesis and modification of poly (ether ether ketone) and their properties: A review. Polym Rev, 2012;52(2):189-228. Epub May 4, 2012.

Ulrich et al., Sulfonated poly(aryl ether ketone)s. Die Angewandte Makromolekulare Chemie (currently known as Macromolecular Materials and Engineering). Dec. 1998;263(1):71-8.

Vachal et al., Structure-based analysis and optimization of a highly enantioselective catalyst for the strecker reaction. J Am Chem Soc. Aug. 28, 2002;124(34):10012-4. Epub Aug. 3, 2002.

Varcoe et al, Anion-exchange membranes in electrochemical energy systems. Energy Environ Sci 2014;7(10):3135-91. Epub Aug. 4, 2014.

Wang et al., A polytetrafluoroethylene-quaternary 1,4-diazabicyclo-[2.2.2]-octane polysulfone composite membrane for alkaline anion exchange membrane fuel cells. Intl J Hydrogen Energy. 2011;36(16):10022-6. doi: 10.1016/j.ijhydene.2011.05.054. Epub Jun. 12, 2011.

Yan et al., Quaternized poly(ether ether ketone) hydroxide exchange membranes for fuel cells. J Membr Sci 2011;375(1-2):204-11. doi: 10.1016/j.memsci.2011.03.046. Epub Mar. 29, 2011.

Yan et al., Quaternary phosphonium-functionalized poly(ether ether ketone) as highly conductive and alkali-stable hydroxide exchange membrane for fuel cells. J Membr Sci. 2014;466:220-8. doi: 10.1016/j.memsci.2014.04.056. Epub May 9, 2014.

Zaidi et al., Proton conducting composite membranes from polyether ether ketone and heteropolyacids for fuel cell applications. J Membr Sci. 2000;173(1):17-34.

* cited by examiner

68% yield over two steps
synthesized in 50 g batches

FUNCTIONALIZED TRIPTYCENE POLYMERS AND THEIR USES

RELATED APPLICATIONS

This application claims priority under 35 U.S.C. § 119(e) to U.S. Provisional Application Ser. No. 62/194,740, filed Jul. 20, 2015, and to U.S. Provisional Application Ser. No. 62/307,264, filed Mar. 11, 2016, each of which is incorporated herein by reference in its entirety for all purposes.

FIELD OF THE INVENTION

Embodiments described herein relate to compositions and devices including iptycene-based materials.

BACKGROUND OF THE INVENTION

Poly(arylethers) (PAEs) are polymers that have found widespread commercial use. As a member the 'engineering thermoplastic' family, this class of polymers is generally known for its high chemical resistance, low cost, high thermal stability, and excellent mechanical properties. As a result of these properties, its main applications are found in 'high-performance' materials, which demand mechanical integrity in harsh environments, such as in aircraft or automobiles. However, due to, for example, insolubility, chemical modification of some poly(arylethers) such as poly(ether ether ketone) (PEEK) can be difficult. Accordingly, additional materials and methods are needed to impart new functionality to this class of materials.

SUMMARY OF THE INVENTION

Compositions and devices comprising iptycene-based compounds are provided. In one aspect, compositions are provided. In some embodiments, the composition comprises a polymer having a backbone, the backbone comprising an iptycene-based compound and an aryl ether-based compound. In certain embodiments, the polymer comprises a structure as in:

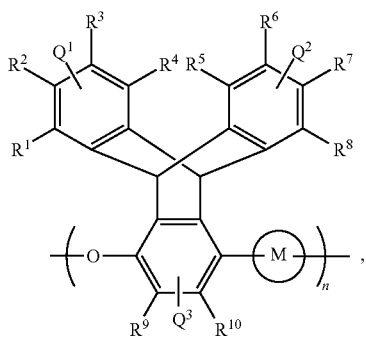

wherein $R^1$-$R^{10}$ can be the same or different and are hydrogen, halo, hydroxyl, amino, alkyl, heteroalkyl, alkenyl, alkynyl, aryl, heteroaryl, heterocyclyl, urea, thio-urea, imidizolium, phosphonium, diazonium, sulfate, nitro, nitrile, or a carbonyl group, any of which is optionally substituted, or, any two adjacent groups of $R^1$-$R^{18}$ can be joined together to form an optionally substituted ring, $Q^1$-$Q^3$ can be the same or different and are absent, a nitrogen containing compound, a sulfur containing compound, a urea containing compound, a thiourea containing compound, and/or a fluorine containing compound, any of which is optionally substituted, M is an aryl ether compound, and n is an integer greater than 1.

In another aspect, devices are provided. In some embodiments, the device comprises a polymer having a backbone, the backbone comprising an iptycene-based compound and an aryl ether-based compound.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every embodiment of the invention shown where illustration is not necessary to allow those of ordinary skill in the art to understand the invention. In the figures:

FIG. 18A shows the original film and the material obtained when this film is removed and shaped by hand into a cylinder. FIGS. 18B-C show viscoelastic deformation of this cylinder;

DETAILED DESCRIPTION

Figure 1A:
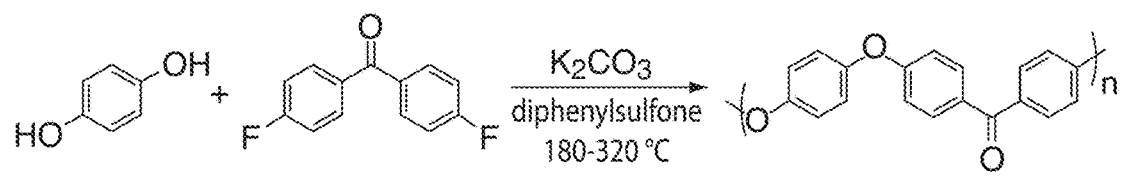
FIG. 1A shows the synthesis and structure of poly(ether ether ketone) PEEK, according to one set of embodiments.

Embodiments described herein relate to compositions and devices including iptycene-based structures. The subject matter of the present invention involves, in some cases, interrelated products, alternative solutions to a particular problem, and/or a plurality of different uses of one or more systems and/or articles.

Some embodiments provide compositions including polymers having a backbone comprising an iptycene-based compound. Some embodiments described herein provide compositions having enhanced properties such as enhanced porosity, increased glass transition temperatures, and/or improved solubility as compared to traditional poly(aryl ether)-based compounds or traditional iptycene-based compounds. In some cases, the compositions may include various aryl ether compounds such as an aryl ether ketone incorporated into the polymer backbone. Non-limiting examples of suitable aryl ether compounds include polyarylethersulfones, polyaryletherketones, polyetherimides, and polyphenylene ethers. The compositions described herein may be useful in a wide variety of applications, including structural materials, flexible composites, ion conductors, fuel cell membranes such as proton exchanging membranes, sensors, preconcentrators, absorbents, or the like.

In some embodiments, the iptycene-based compound includes a triptycene core. In some embodiments, the iptycene-based compound includes a pentiptycene core. It should be understood that the compound may include other, extended iptycene cores which have, for example, additional numbers of branches, arene planes, and/or extended bridgehead structures. For example, the central phenyl ring of a pentiptycene core may have an extended structure such as a central anthracene ring system. The synthesis of iptycenes and like molecules is described in, for example, Hart, "Iptycenes, Cuppendophanes and Cappedophanes," Pure and Applied Chemistry, 65(1):27-34 (1993); and Shahlia et al., "Synthesis of Supertriptycene and Two Related Iptycenes," Journal of Organic Chemistry, 56:6905-6912 (1991), the contents of which are incorporated herein by reference. In some embodiments, the iptycene core may be synthesized via a Diels-Alder reaction between an anthracene species and a benzyne species.

In some cases, the iptycene-based compound includes carbazole moieties, wherein an amino-substituted triptycene core is substituted with halo-substituted aryl group via a transition-metal catalyzed cross-coupling reaction. The resulting compound may then be cyclized to form the carbazole moieties. The compound may be further substituted, for example, at the nitrogen of the carbazole groups. In some embodiments, the carbazole moieties may be functionalized with substituted aryl groups.

Compounds described herein may also include other optionally substituted heterocyclyl or heteroaryl groups rigidly bonded to the iptycene core. In some cases, the iptycene-based compound includes other nitrogen-containing, oxygen-containing, and sulfur-containing moieties appended to the iptycene core. In some cases, the compound may include a metal-containing group (e.g., Si-containing group) appended to the iptycene core.

In some cases, the iptycene-based compound may also be incorporated into a polymeric system. In some cases, the iptycene-based compound may be covalently bonded to a polymer. For example, iptycene-based compound may be covalently bonded to a polymer backbone via a pendant side group. In some cases, the iptycene-based compound may be positioned within a polymer backbone. For example, the iptycene-based compound may be bonded to a polymer via atoms of a heterocyclyl or heteroaryl group, and/or via bridgehead atoms of the iptycene core.

In some embodiments, the iptycene-based compound is incorporated into a polymer as shown in Formula (I),

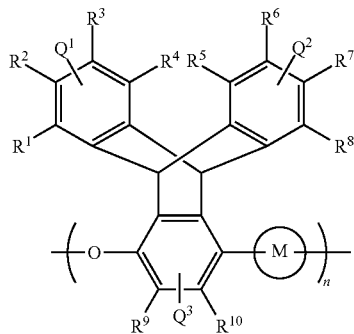

(I)

wherein:

R¹-R¹⁰ can be the same or different and are hydrogen, halo, hydroxyl, amino, alkyl, heteroalkyl, alkenyl, alkynyl, aryl, heteroaryl, heterocyclyl, urea, thio-urea, imidizolium, phosphonium, diazonium, sulfate, nitro, nitrile, or a carbonyl group, any of which is optionally substituted, or, any two adjacent groups of R¹-R¹⁸ can be joined together to form an optionally substituted ring, Q¹-Q³ can be the same or different and are absent, a nitrogen containing compound, a sulfur containing compound, a urea containing compound, a thiourea containing compound, and/or a fluorine containing compound, any of which is optionally substituted, M is an aryl ether compound, and n is an integer greater than 1.

In some embodiments, M is an aryl ether compound comprising two or more aryl groups. Non-limiting examples of aryl ether compounds comprising two or more aryl groups for incorporation into the polymers described herein include:

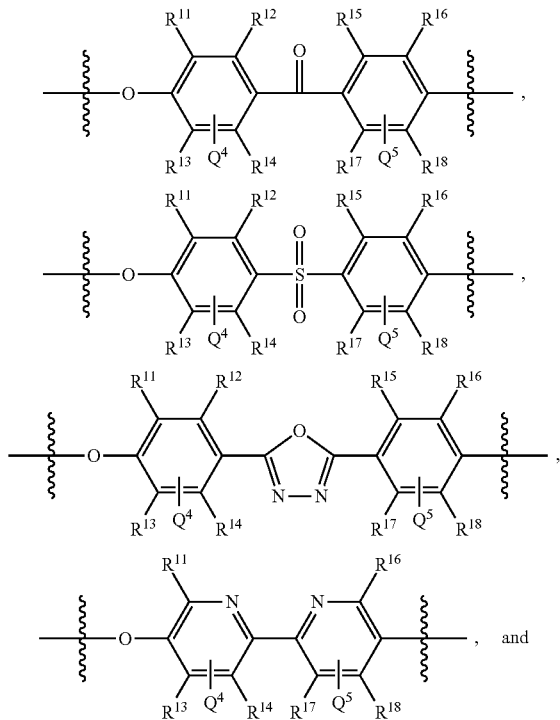

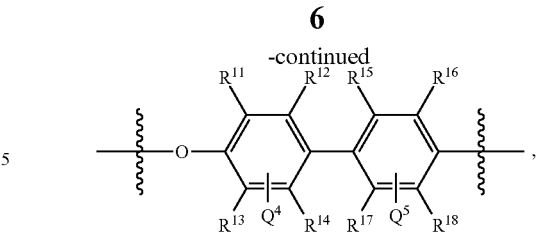

wherein:

R¹¹-R¹⁸ can be the same or different and are hydrogen, halo, hydroxyl, amino, alkyl, heteroalkyl, alkenyl, alkynyl, aryl, heteroaryl, heterocyclyl, urea, thio-urea, imidizolium, phosphonium, diazonium, sulfate, nitro, nitrile, or a carbonyl group, any of which is optionally substituted, or, any two adjacent groups of R¹-R¹⁸ can be joined together to form an optionally substituted ring, and Q⁴-Q⁵ can be the same or different and are absent, a nitrogen containing compound, a sulfur containing compound, a urea containing compound, a thiourea containing compound, and/or a fluorine containing compound, any of which is optionally substituted.

Figure 1B:
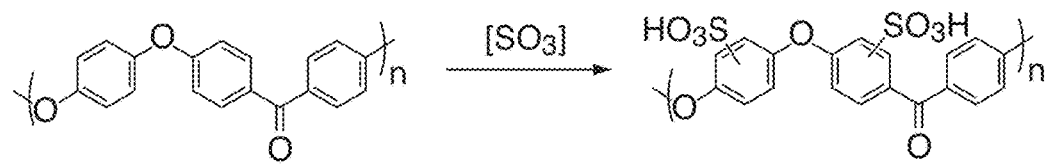
FIG. 1B shows the sulfonation of PEEK, according to one set of embodiments.

In some embodiments, R¹¹-R¹⁸ can be the same or different and are hydrogen or fluorine. Non-limiting examples of polymers incorporating aryl ether groups into the backbone, having two or more aryl groups, and exemplary synthesis methods, include those shown in FIG. 1D. While FIG. 1D demonstrates the incorporation of aryl ether groups into an iptycene based structure as shown in FIG. 1D, those skilled in the art would understand that iptcyene-based structures described above in the context of Formula (I) may also be suitable.

In some embodiments, the polymer comprising an iptycene-based compound comprises a poly(ether ether ketone). FIG. 1A shows the synthesis and structure of poly(ether ether ketone) (PEEK), in some embodiments. Generally, PEEK is chemically resistant and mechanically tough polymer. The incorporation of triptycene into a PEEK backbone may offer several advantages over PEEK polymers alone, including enhanced porosity of the material (e.g., to aid proton conduction), increased proton conductivity (e.g., as compared to PEEK alone and/or PEEK incorporating hydroquinone), and/or enabling the production of well-dispersed metal nanoparticle embedded thin-films (e.g., in a porous matrix).

In some cases, Q¹-Q⁵ can be the same or different and are absent a nitrogen containing compound, a sulfur containing compound, a urea containing compound, a thiourea containing compound, and/or a fluorine containing compound, any of which is optionally substituted.

In some embodiments, compound is functionalized. In certain embodiments, the compound is sulfonated. In some such embodiments, Q¹-Q⁵ can be the same or different and are absent and/or a sulfur containing compound. In some embodiments, the sulfur containing compound is SO₃H. In certain embodiments, the compound is nitrated. In some such embodiments, Q¹-Q⁵ can be the same or different and are absent and/or a nitrogen containing compound. In some embodiments, the nitrogen containing compound is selected from the group consisting of NO₂ and NH₂. In certain embodiments, the nitrogen containing compound is selected from the group consisting of NO₂, NH₂, and diazonium, thiourea, imidizolium, or organic diarylazo chromophore. FIG. 1B shows an exemplary aryl ether compound (e.g., PEEK) that has been sulfonated by sulfonic acid. In some embodiments in which the polymer comprises one or more nitrogen groups NH₂, one or more of the NH₂ groups may be readily converted to another functional group (e.g., amides, peptides, ureas, thioureas). For instance, one or more NH$_2$ groups may be readily converted into diazonium ions (e.g., N$_2^+$). In certain embodiments, the diazonium ion may provide additional reactivity to the materials for cross-linking and reaction with nucleophiles. Non-limiting examples, include the reaction with N-methyl-imidazole to attach an imidazolium ion to the polymer, or reaction with phenolic compounds to create new chromophores, with N=N-aryl groups. The latter reactivity may extend to aromatic compounds having pendant amines and the generation of chromophores. In some such cases the chromophore can be useful as a photoresponsive composition or as a detection method for these compounds. For example this composition could be used for the detection of the drug, such as THC, which is the active compound in cannabis. In some embodiments, the compound may be sulfonated by sulfuric acid, sulfuric acid/methane sulfonic acid mixtures, sulfur trioxide-triethyl phosphate complexes, and/or chlorosulfonic acid. Sulfonated polymers comprising aryl ether compounds (e.g., PEEK) and incorporating an iptycene-based compound may offer several advantages as compared to traditional polymers including lower cost, increased thermal stability, and/or lower fuel crossover.

Figure 1C:
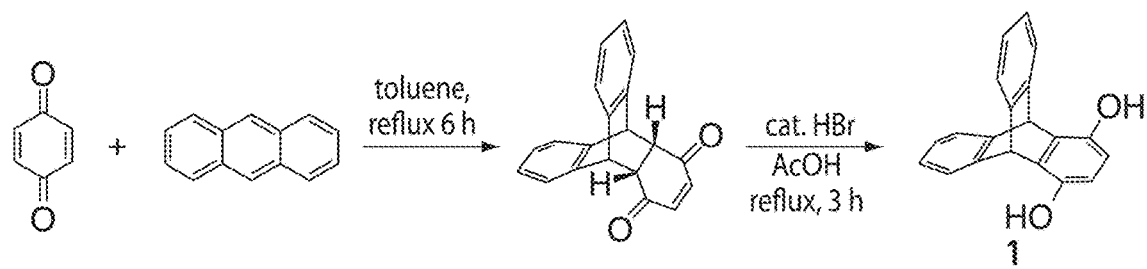
FIG. 1C shows the synthesis of triptycene diol, according to one set of embodiments.
Figure 1D:
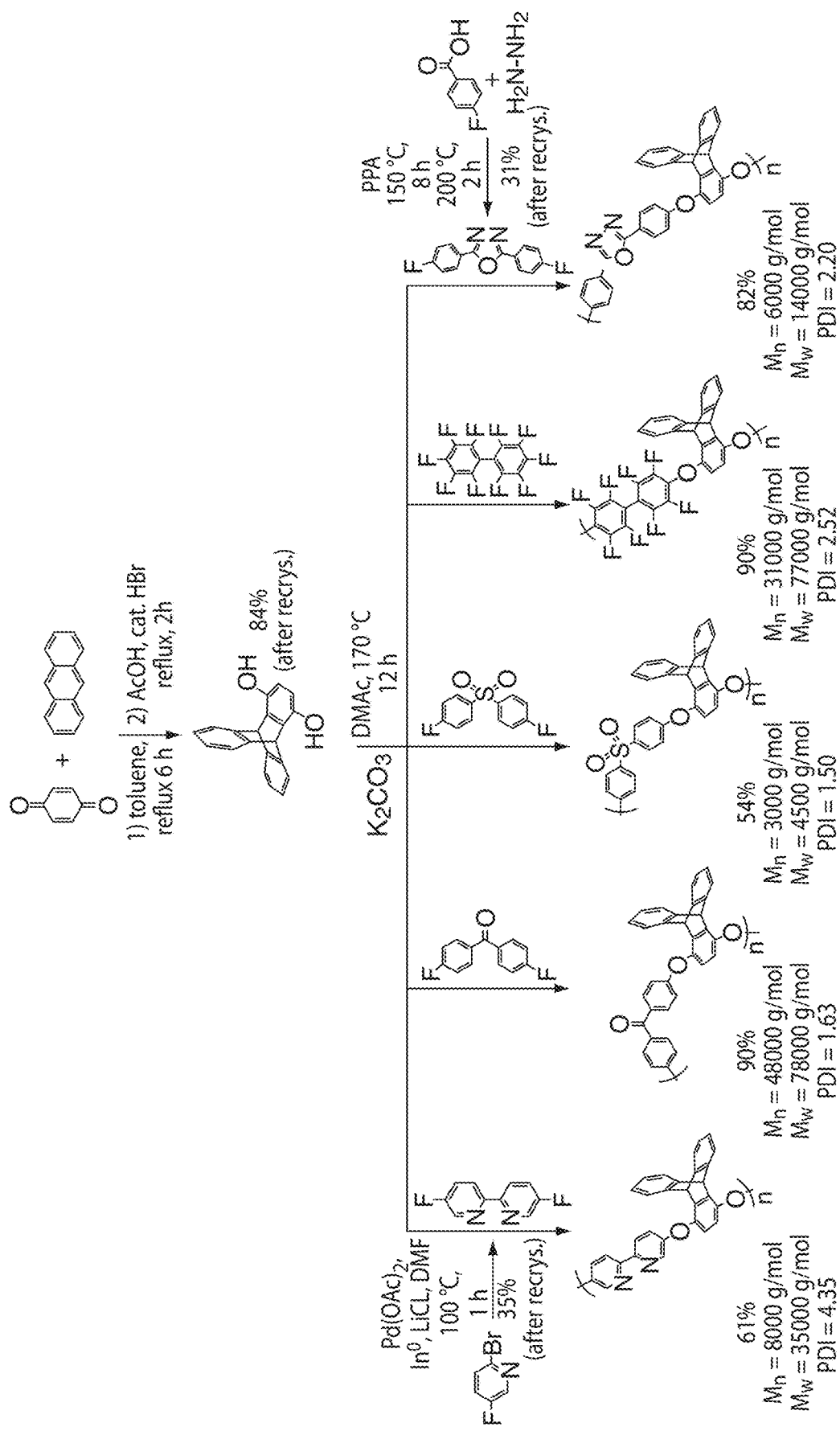
FIGS. 1D-1F shows the synthesis of exemplary aryl ether- and iptycene-based polymer, according to some embodiments.
Figure 1E:
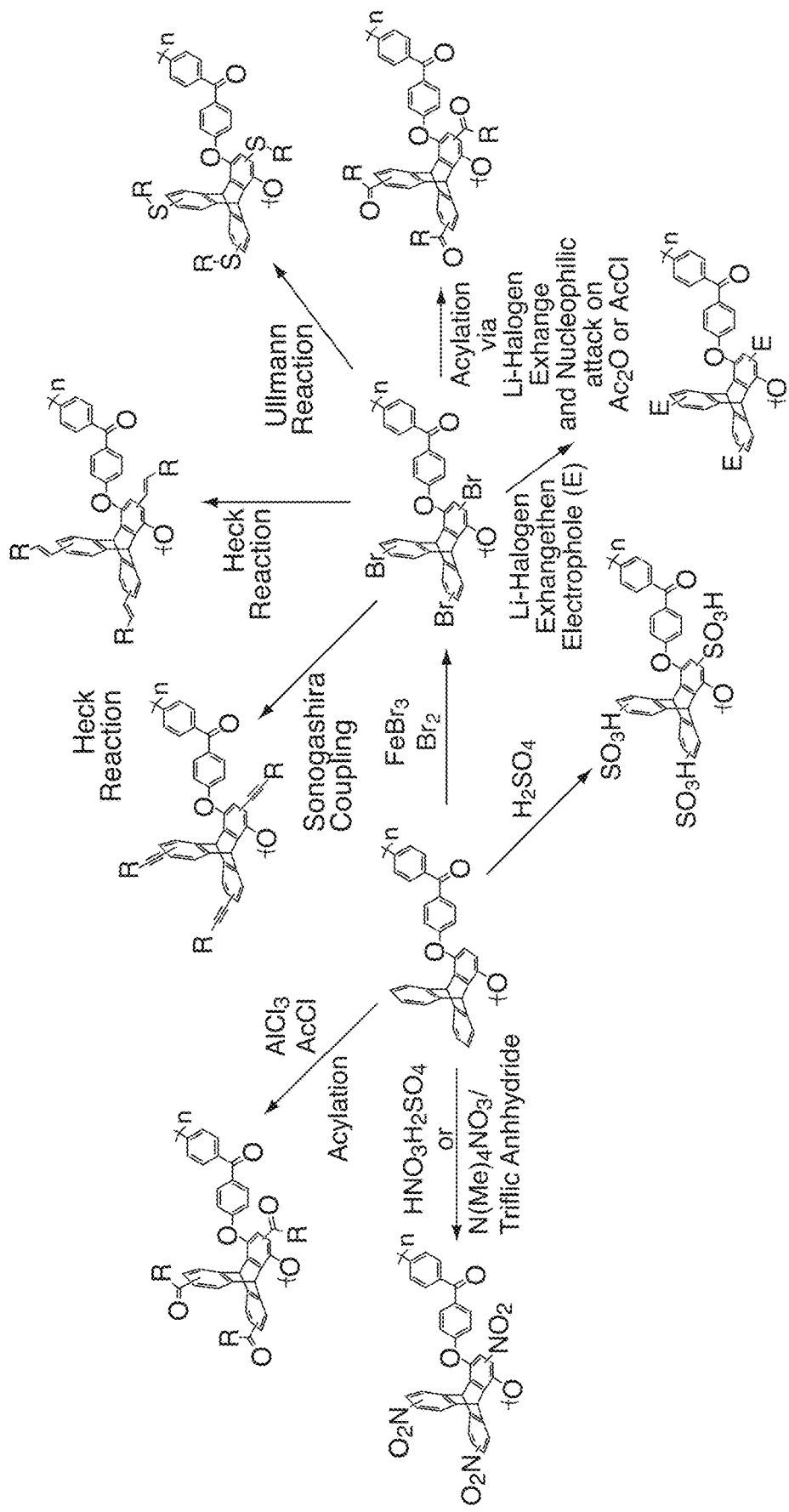
Figure 1F:
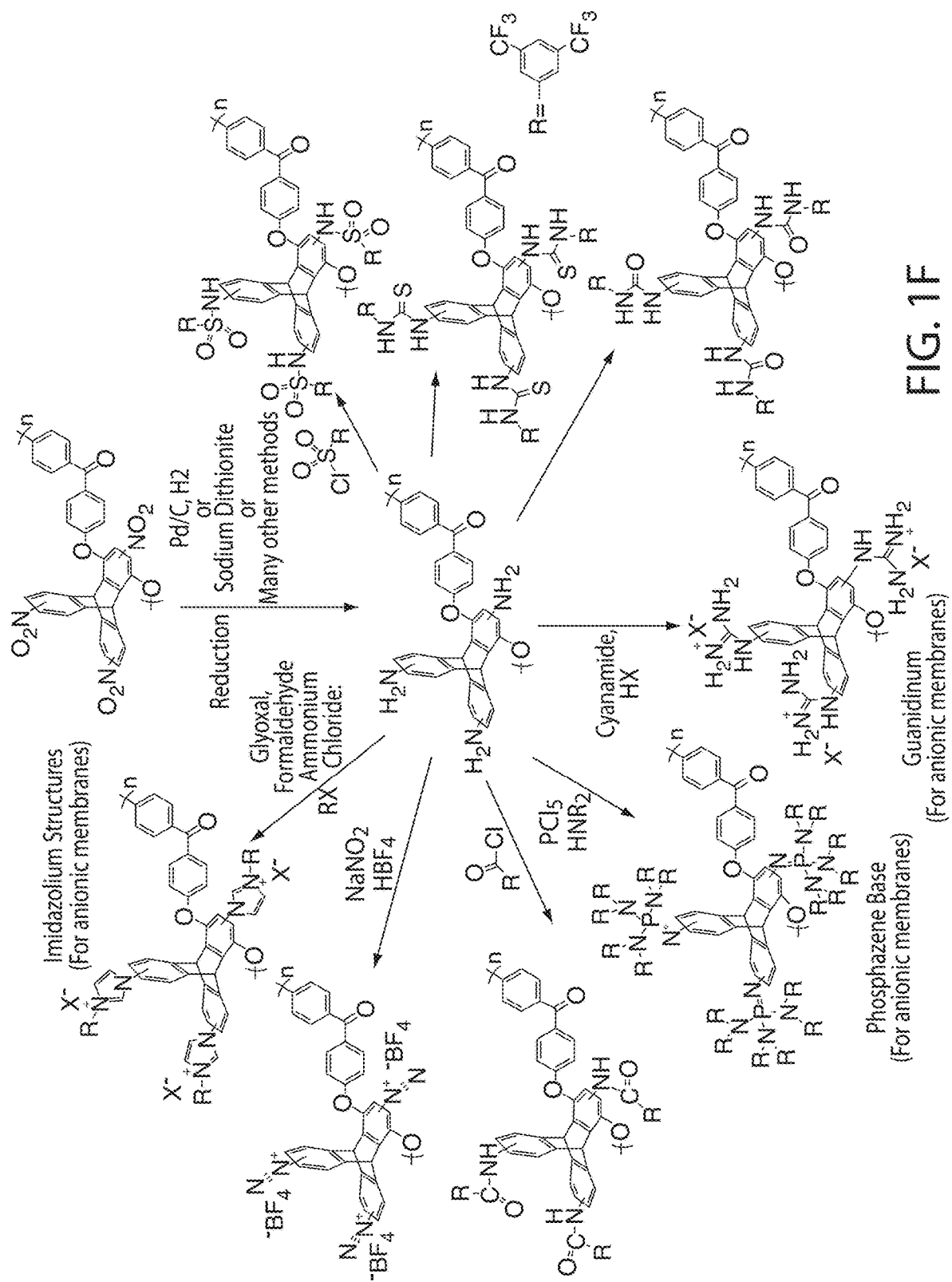

Non-limiting examples of suitable functional groups (i.e. Q$^1$-Q$^5$), and their respective reaction schemes, are shown in FIG. 1E and FIG. 1F. Each R in FIG. 1E and FIG. 1F can be the same or different and are hydrogen, halo, hydroxyl, amino, alkyl, heteroalkyl, alkenyl, alkynyl, aryl, heteroaryl, heterocyclyl, urea, thio-urea, imidizolium, phosphonium, diazonium, sulfate, nitro, nitrile,

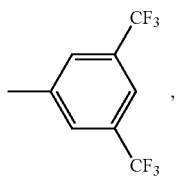

or a carbonyl group, any of which is optionally substituted. Each X in FIG. 1F can be the same or different counterion. Non-limiting examples of suitable counterions include hydroxide and halogen ions. Other counterions are also possible and those skilled in the art would be capable of selecting other suitable counterions based upon the teachings of this specification. While FIGS. 1E-1F demonstrate the functionalization of an polymer comprising an ether ether ketone and iptycene incorporated into the backbone of the polymer, those skilled in the art would understand that iptcyene-based structures described above in the context of Formula (I) as well as various aryl ether groups described here may also be suitable. In an exemplary embodiments, the polymer can be reacted via electrophilic aromatic substitution reactions such as bromination or acylation (Friedel-Crafts). For example, the brominated structures can undergo lithium halogen exchange to make them act as general nucleophiles or participate in metal coupling reactions.

Non-limiting examples of polymers of Formula (I) comprising an iptycene-based compound and an aryl ether-based compound include:

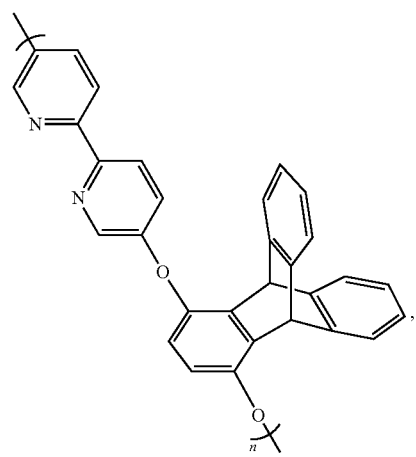

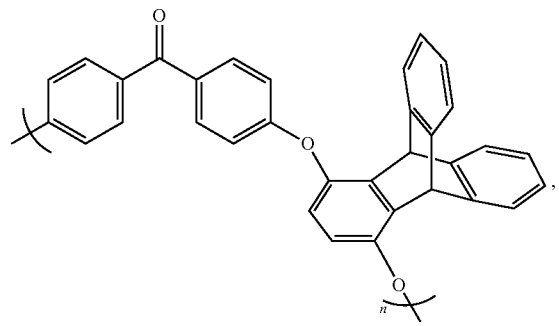

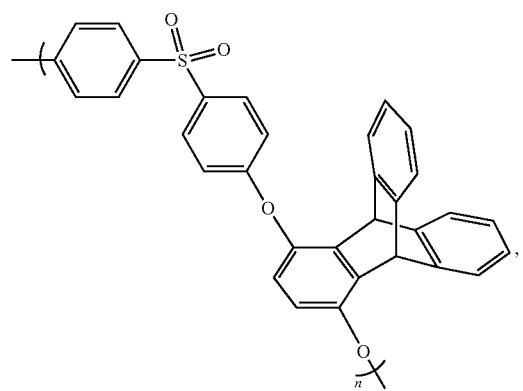

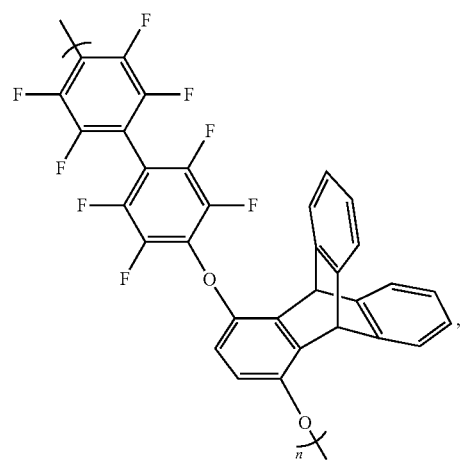

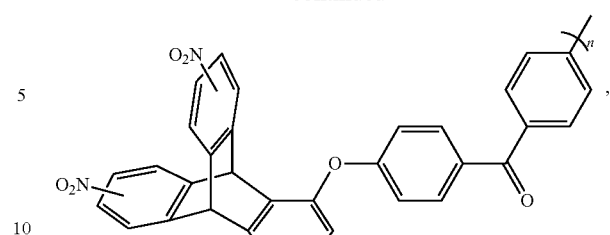
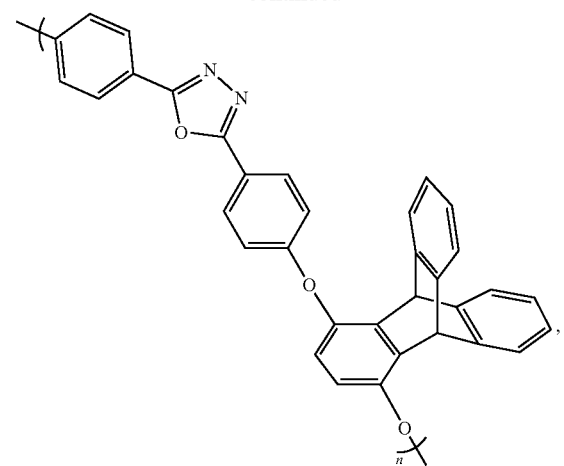
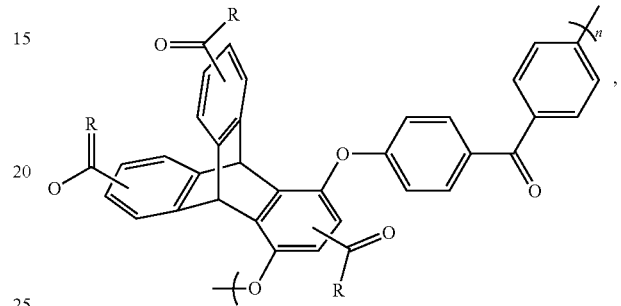
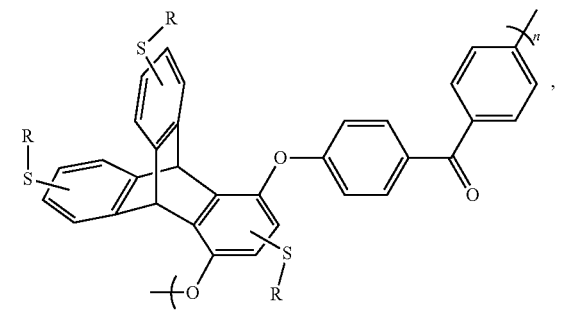
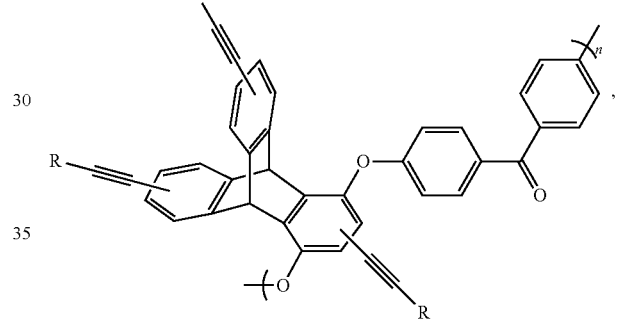
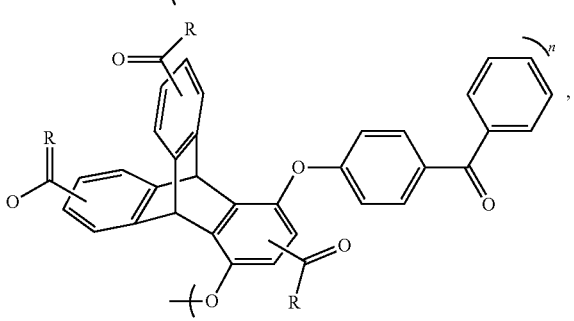
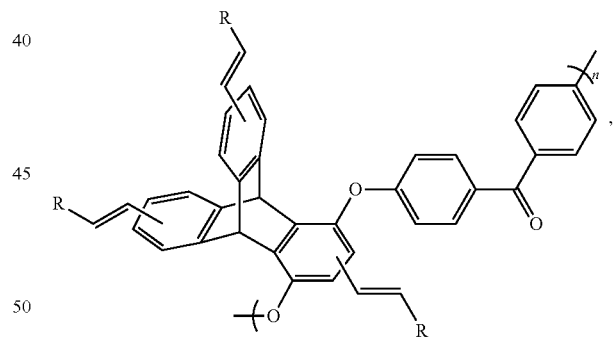
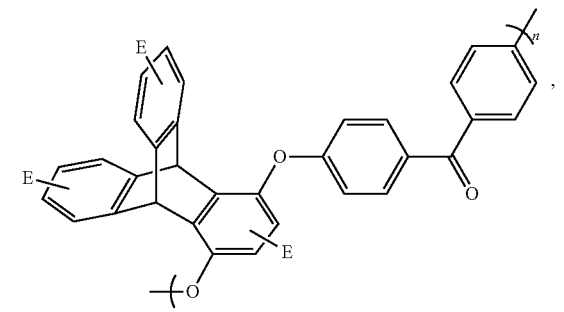
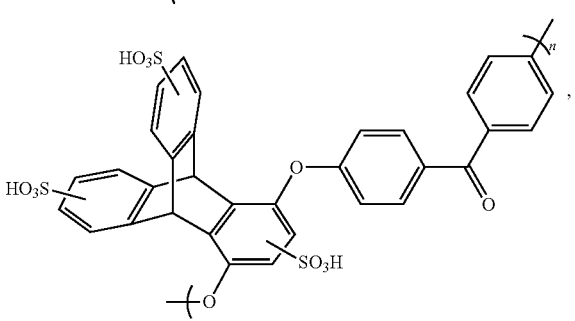
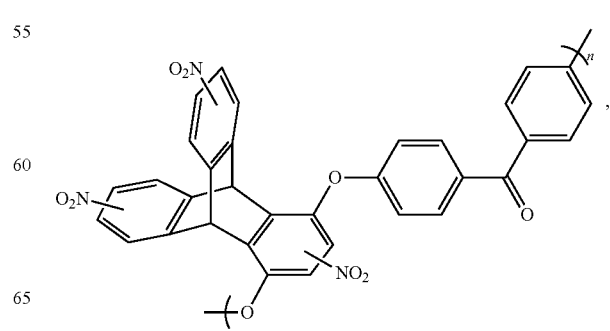

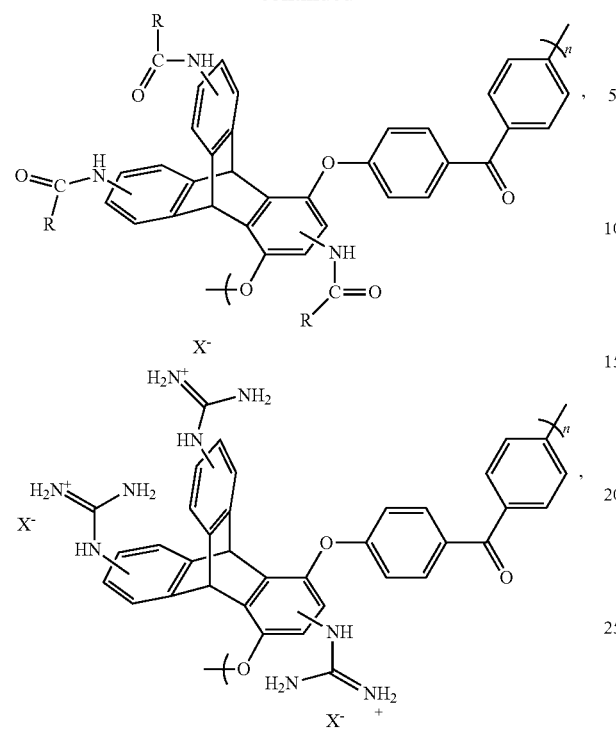
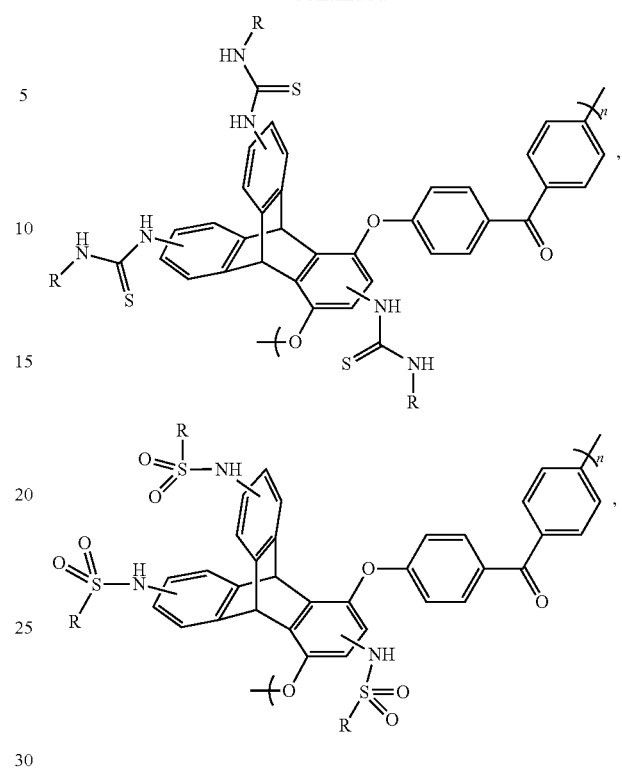
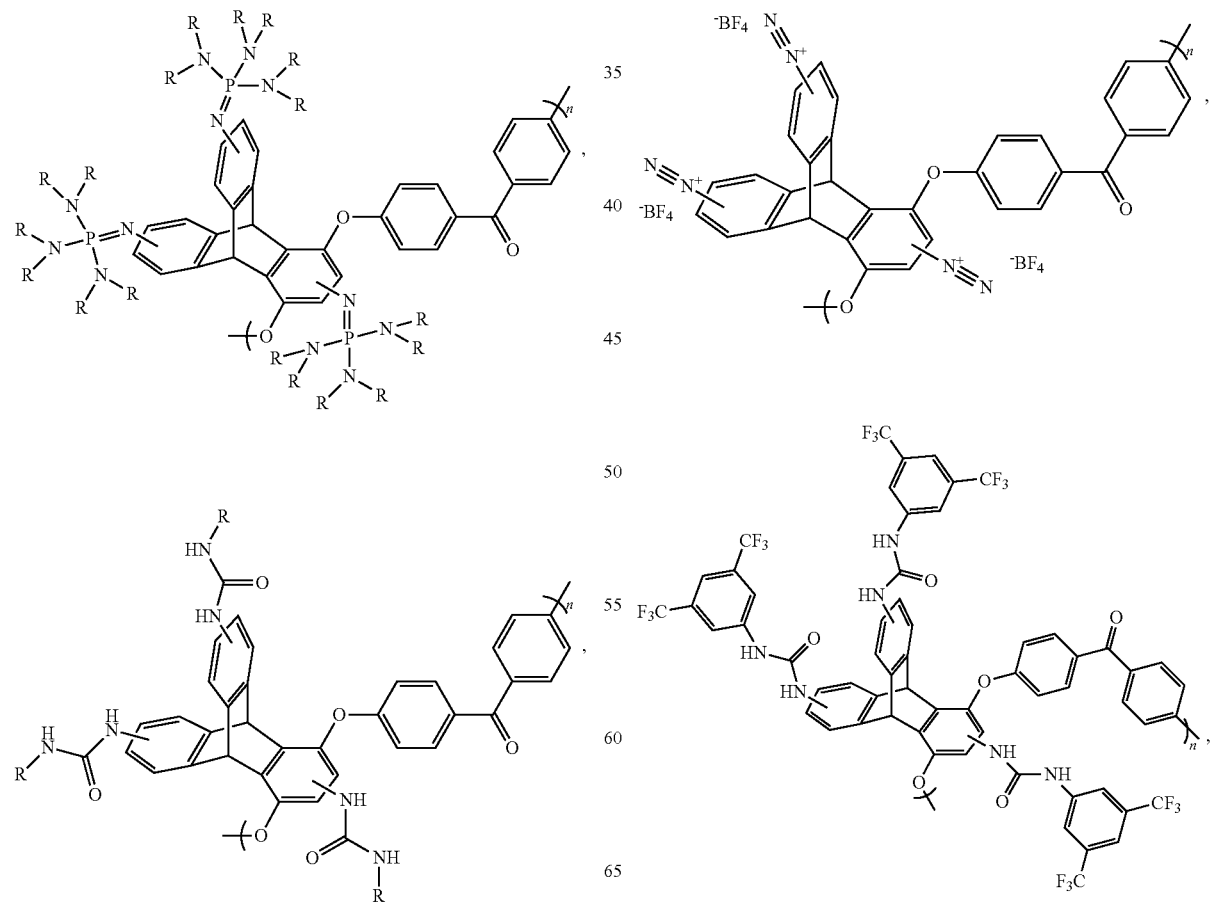

-continued

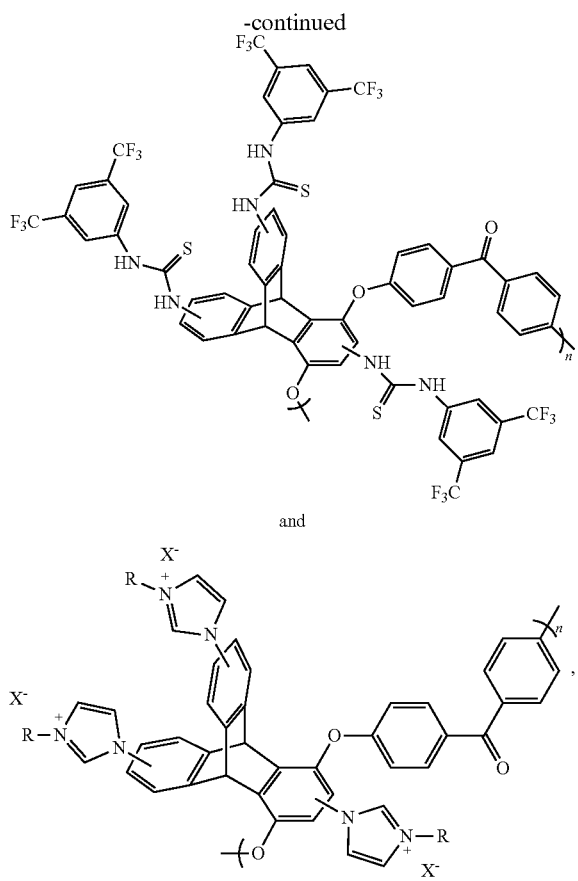

and wherein n is an integer greater than 1, each R is the same or different and are hydrogen, halo, hydroxyl, amino, alkyl, heteroalkyl, alkenyl, alkynyl, aryl, heteroaryl, heterocyclyl, urea, thio-urea, imidizolium, phosphonium, diazonium, sulfate, nitro, nitrile,

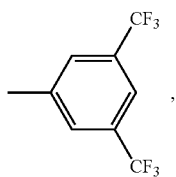

or a carbonyl group, any of which is optionally substituted, each E is the same or different and is an electrophile, and each X is the same or different and is a counterion. Other iptycene and aryl ether-based compounds are also possible and those skilled in the art would be capable of selecting suitable compounds based upon the teachings of this specification.

In some embodiments, the polymers described herein (e.g., having a backbone, the backbone comprising an iptycene-based compound and an aryl ether-based compound) may comprise a counter ion. For example, in some embodiments, the polymer may be sulfonated (e.g., $SO_3^-$) and comprise a counter-ion such as $H^+$, lanthanides, and/or Group I metal ions. In certain embodiments, the polymers described herein may be added to an ionic liquid (e.g., for anhydrous proton conductivity) comprising ionic liquid counter ions. Non-limiting examples of ionic liquid counter ions include imidzaloium, phosphonium, and salts thereof.

Referring again to Formula (I), in some embodiments, n ranges between about 1 and 1000000. For example, in some cases, n is at least about 2, at least about 10, at least about 100, at least about 1,000, at least about 10,000, at least about 20,000, at least about 50,000 or at least about 75,000. In some embodiments, n is less than or equal to about 100,000, less than or equal to about 75,000, less than or equal to about 50,000, less than or equal to about 20,000, less than or equal to about 10,000, less than or equal to about 1,000, less than or equal to about 100, or less than or equal to about 10. Combinations of the above-referenced ranges are also possible (e.g., between about 2 and about 1,000, between about 1 and about 100,000, between about 10,000 and about 100,000). Other ranges are also possible.

In some embodiments, the polymer (e.g., having a backbone, the backbone comprising an iptycene-based compound and a polyaryl ether compound) has a number average molecular weight of greater than or equal to 1 kDa, greater than or equal to 5 kDa, greater than or equal to 10 kDa, greater than or equal to 25 kDa, or greater than or equal to 50 kDa. In certain embodiments, the polymer has a number average molecular weight of less than or equal to 100 kDa, less than or equal to 50 kDa, less than or equal to 25 kDa, less than or equal to 10 kDa, or less than or equal to 5 kDa. Combinations of the above referenced ranges are also possible (e.g., greater than or equal to 1 kDa, less than or equal to 100 kDa). Other ranges are also possible.

In some embodiments, the composition is a polymer composite. The polymer composite comprises, in some cases, a first polymer comprising the aryl ether- and iptcyene-based compound as described above, and a second polymer different than the first polymer.

The use a polymer composite comprising a first polymer comprising the aryl ether- and iptcyene-based compound as described above may, advantageously, provide good structural properties (e.g., improved flexibility and/or mechanical strength).

Non-limiting examples of suitable polymers for use as the second polymer in the composite include poly(THF), polyamide, polyurethane, poly(ethylene glycol), and poly(dimethylsiloxane).

In some embodiments, the second polymer has a glass transition temperature less than or equal to about 25° C. In certain embodiments, the second polymer has a glass transition temperature of less than or equal to about 20° C., less than or equal to about 15° C., less than or equal to about 10° C., less than or equal to about 5° C., less than or equal to about 0° C., less than or equal to about −10° C., less than or equal to about −20° C., less than or equal to about −30° C., or less than or equal to about −40° C. In some embodiments, the second polymer has a glass transition temperature of at least about −50° C., at least about −40° C., at least about −30° C., at least about −20° C., at least about −10° C., at least about 0° C., at least about 5° C., at least about 10° C., at least about 15° C., or at least about 20° C. Combinations of the above referenced ranges are also possible (e.g., between about −50° C. and about 25° C.). Other ranges are also possible.

Figure 1G:
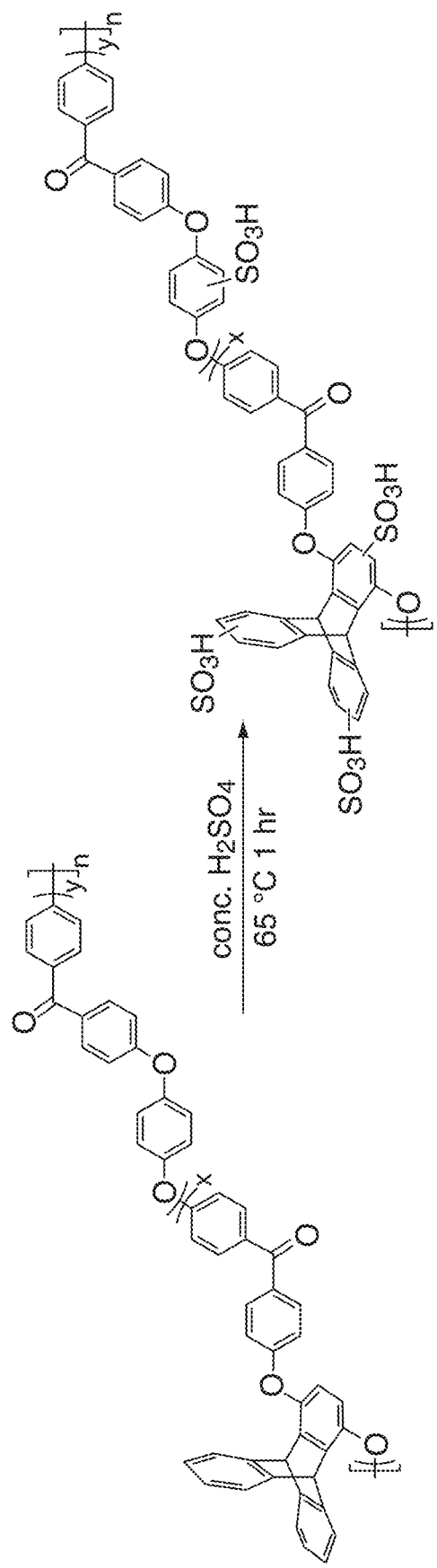
FIG. 1G shows the synthesis of an exemplary polymer comprising an aryl ether- and iptycene-based copolymer, according to some embodiments.

In some embodiments, the polymer may be a copolymer. The polymer may be a copolymer of a first polymer having a backbone, the backbone comprising an iptycene-based compound and a first aryl ether-based compound, and a second polymer comprising a second aryl ether-based compound. The second aryl ether-based compound may be the same or different as the first aryl ether-based compound. For example, as illustrated in FIG. 1G, in some embodiments the polymer may be a copolymer of a first polymer having a backbone, the backbone comprising an iptycene-based compound and an ether ether ketone, and a second polymer comprising an ether ether ketone (e.g., a triptycene-PEEK-co-PEEK polymer). Other combinations of iptycene-based compounds and first and second aryl ether-based compounds are also possible and those skilled in the art would be capable of selecting suitable compounds based upon the teachings of this specification.

Non-limiting examples of copolymers of a first polymer having a backbone, the backbone comprising an iptycene-based compound and a first aryl ether-based compound, and a second polymer comprising a second aryl ether-based compound include:

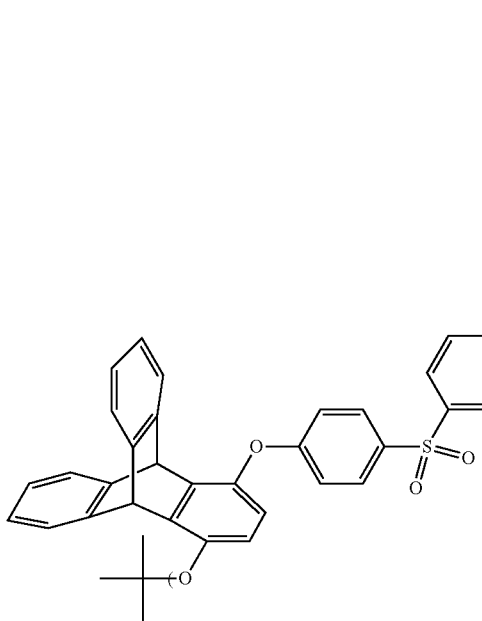

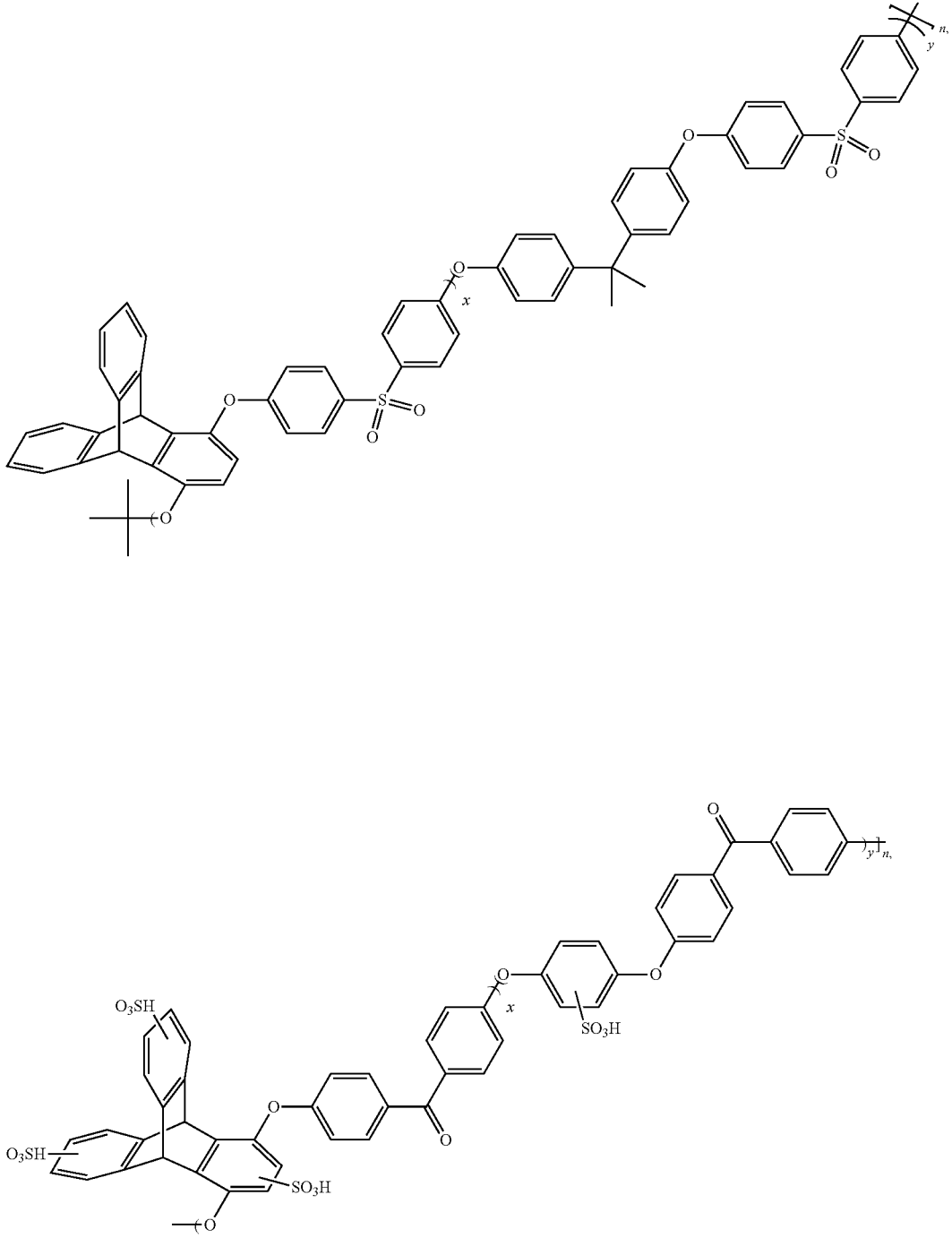

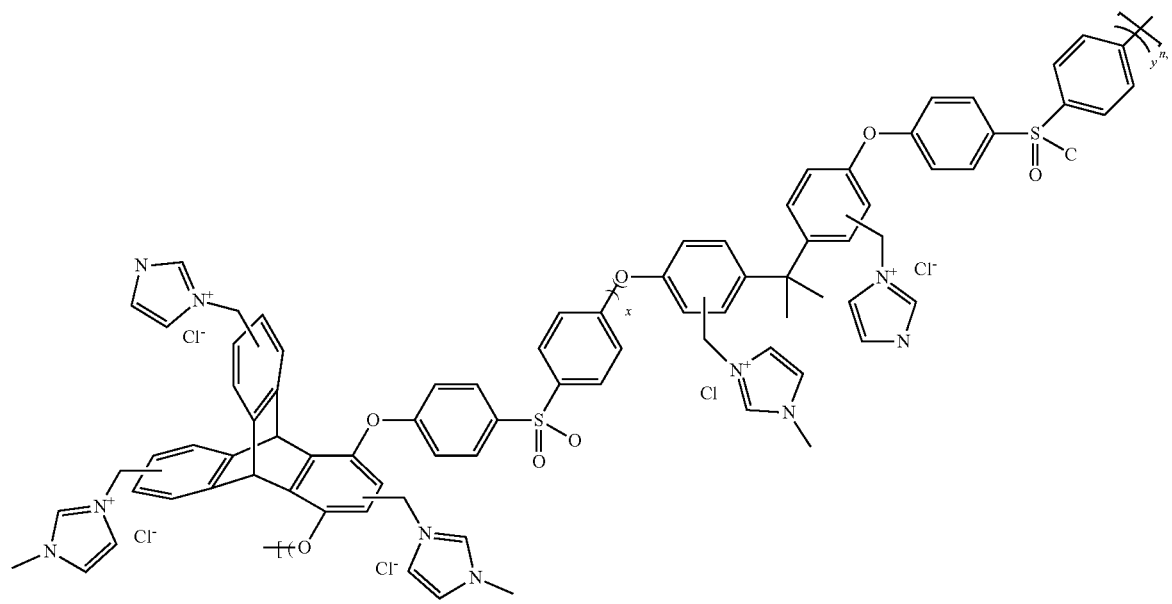
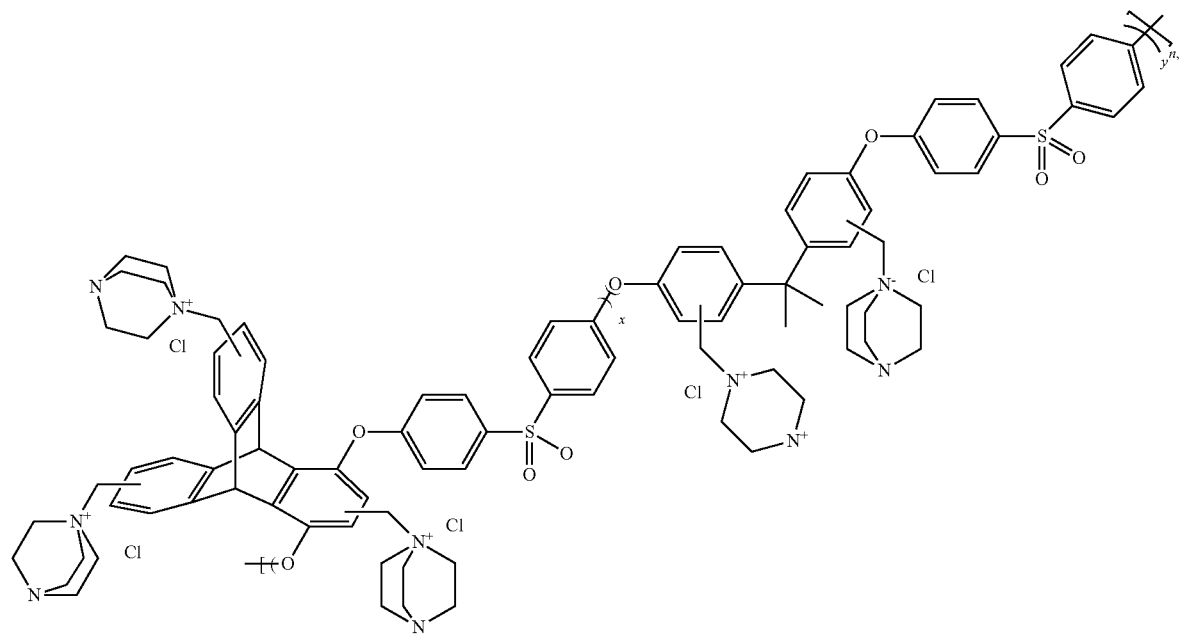
and

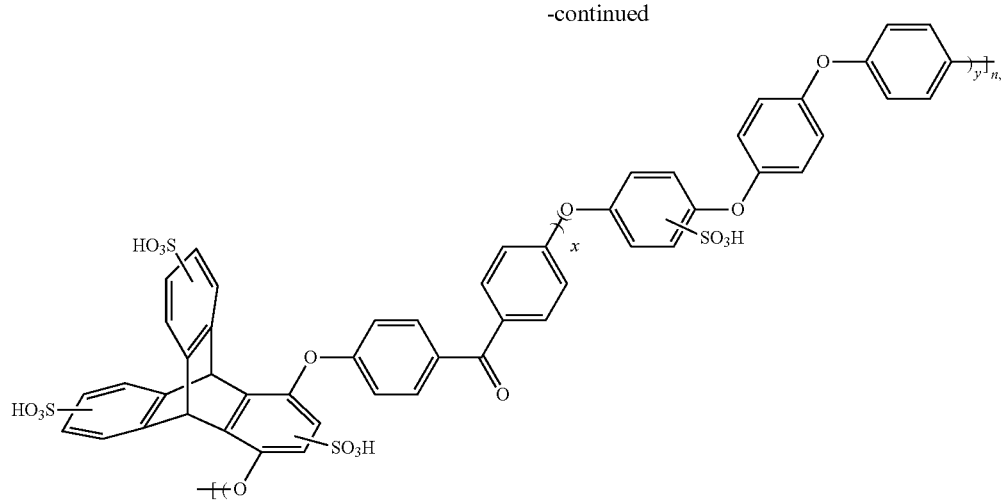

wherein n is an integer and at least 1, x is greater than 0 and less than 1, and y is greater than 0 and less than 1 such that x+y=1.

In some embodiments, the polymer (e.g., the polymer having a backbone, the backbone comprising an iptycene-based compound and an aryl ether-based compound) may have a particular ion (proton) conductivity. In some embodiments, the ion conductivity of the polymer is greater than or equal to $10^{-5}$ S/cm, greater than or equal to $10^{-4}$ S/cm, greater than or equal to $10^{-3}$ S/cm, greater than or equal to $10^{-2}$ S/cm, or greater than or equal to 0.1 S/cm. In certain embodiments, the ion conductivity of the polymer is less than or equal to 0.3 S/cm, less than or equal to 0.1 S/cm, less than or equal to $10^{-2}$ S/cm, less than or equal to $10^{-3}$ S/cm, or less than or equal to $10^{-4}$ S/cm. Combinations of the above referenced ranges are also possible (e.g., greater than or equal to $10^{-5}$ S/cm and less than or equal to 0.3 S/cm). Other ranges are also possible. Ion conductivity may be measured using impedance spectroscopy.

Some embodiments may provide the polymer (e.g., the polymer having a backbone, the backbone comprising an iptycene-based compound and an aryl ether-based compound) or compositions described herein combined with, dispersed within, covalently bonded to, coated with, formed on, or otherwise associated with, one or more materials (e.g., small molecules, polymers, metals, metal complexes, etc.) to form a film or layer in solid state. For example, the iptycene-based compound may be combined with an electroactive material to form a film. In some cases, the iptycene-based compound may be combined with a hole-transport polymer. In some cases, the iptycene-based compound may be combined with an electron-transport polymer. In some cases, the iptycene-based compound may be combined with a hole-transport polymer and an electron-transport polymer. In some cases, the iptycene-based compound may be combined with a copolymer comprising both hole-transport portions and electron-transport portions. In such embodiments, electrons and/or holes formed within the solid film or layer may interact with the iptycene-based compound.

In some embodiments, the compositions described herein may be used, for example, in a proton exchanging membrane (PEM). PEM's are a critical component of proton exchange membrane fuel cells (PEMFC's). In some embodiments, a proton exchange membrane, a cation exchange membrane, or an anion exchange membrane may comprise the compositions or polymers described herein. In some embodiments, the compositions described herein may be crosslinked (e.g., to form a proton exchange membrane) using a crosslinking agent such as chlorosulfonic acid. Advantageously, crosslinked polymers comprising the iptycene-based compound may exhibit mechanical stability in water.

In some cases, ion exchange membranes comprising polymers described herein may maintain high ionic conductivity in thin film former when the membrane is constrained environment between two solid surfaces and/or may functions in an anhydrous environment.

In some cases, the device comprising the polymers described herein is a fuel cell. Fuel cells generally have high power conversion efficiencies and do not emit environmentally harmful gases associated with combustion; as such, they have attracted considerable attention as a means to cheaply and cleanly generate large amounts of electricity. However, while the fuels which are required to power fuel cells, such as $H_2$ and $O_2$, are abundant, widespread commercialization is generally hindered by three factors 1) fuel crossover (e.g., fuel leaking from the anode to the cathode); 2) anodic catalyst poisoning by CO; and 3) high cost of the proton exchange membrane (PEM). In general, the higher the operating temperature of a fuel cell, the less catalyst poisoning occurs. As the membrane is the component, which limits operation temperature, by creating new membrane materials such as materials comprising the polymers described herein, can perform at higher temperatures while catalyst poisoning can be minimized. In certain embodiments, the device comprises two conductive electrodes.

In yet another embodiment, the device may comprise a polymer having a backbone, the backbone comprising an iptycene-based compound and an aryl ether-based compound, and carbon nanotubes (e.g., single-walled carbon nanotubes (SWCNTs)). Such devices may be useful, for example, as sensors and/or preconcentrators for sensors. For example, in some cases, such devices may concentrate analytes around the carbon nanotubes and/or can absorb molecules such that they may be released to a sensor. In some embodiments, the device may be a chemiresistive sensor.

In some cases, the polymers described herein may be useful, for example, as absorbents (e.g., to reduce odors).

Non-limiting examples of compounds that maybe absorbed include aldehydes, ketones, esters, thiols, thiol-ethers, and/or amines.

In some embodiments, the device comprises a metal ion. In certain embodiments, the device comprises catalytic metal centers. For example, multiple catalytic metal centers may bind to functional groups (e.g., sulfonate groups) arranged at the surface of a nanotube and/or a polymer, such that the nanotube and/or polymer facilitates electrical communication (e.g., electron transfer) between two or more metal centers. In some cases, electron transfer may occur between identical metal centers, between different metal centers, or between a metal center and an electrode (e.g., in an electrochemical process). For example, an electrode may be placed in contact with a solution comprising catalytic metal species and functionalized nanotubes, and electron transfer may occur between the electrode and the catalytic metal species, which may be associated with the nanotube and/or the polymer.

The term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyl groups may be optionally substituted, as described more fully below. Examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like. "Heteroalkyl" groups are alkyl groups wherein at least one atom is a heteroatom (e.g., oxygen, sulfur, nitrogen, phosphorus, etc.), with the remainder of the atoms being carbon atoms. Examples of heteroalkyl groups include, but are not limited to, alkoxy, poly(ethylene glycol)-, alkyl-substituted amino, tetrahydrofuranyl, piperidinyl, morpholinyl, etc. "Fluoroalkyl" groups are alkyl groups wherein at least one hydrogen is replaced with a fluoro group. In some cases, all hydrogen groups of an alkyl group are replaced with fluoro groups to form a fluoroalkyl group (e.g., $CF_3$).

The term "alkoxy" refers to —O-alkyl. A "fluoroalkoxy" group refers to —O— fluoroalkyl.

The terms "alkenyl" and "alkynyl" refer to unsaturated aliphatic groups analogous to the alkyl groups described above, but containing at least one double or triple bond respectively. The "heteroalkenyl" and "heteroalkynyl" refer to alkenyl and alkynyl groups as described herein in which one or more atoms is a heteroatom (e.g., oxygen, nitrogen, sulfur, and the like).

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. "Fluoroaryl" groups are aryl groups that are substituted with at least one fluoro group.

The terms "amine" and "amino" refer to both unsubstituted and substituted amines, e.g., a moiety that can be represented by the general formula: N(R')(R'')(R''') wherein R', R'', and R''' each independently represent a group permitted by the rules of valence.

The term "diazonium" refers to R—$N_2^+$ wherein R represent a group permitted by the rules of valence described herein. For instance, in some embodiments, R is optionally substituted aliphatic or optionally substituted aryl.

The terms "acyl," "carboxyl group," or "carbonyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiocarbonyl" group. Where W is a S-alkyl, the formula represents a "thioester." Where W is SH, the formula represents a "thiocarboxylic acid." On the other hand, where W is alkyl, aryl, or another carbon-containing substituent, the above formula represents a "ketone" group. Where W is hydrogen, the above formula represents an "aldehyde" group.

The terms "electron-withdrawing group," "electron-deficient group," and "electron-poor group" are recognized in the art and as used herein refer to a functionality which draws electrons to itself more than a hydrogen atom would at the same position. Examples of electron-withdrawing groups include carbonyl groups (e.g., ketone, esters, aldehydes), sulfonyl, fluoro, trifluoromethyl, nitro, cyano, and the like.

The terms "electron-donating group" and "electron-rich group" as used herein refer to a functionality which draws electrons to itself less than a hydrogen atom would at the same position. Exemplary electron-donating groups include amino, hydroxy, alkoxy, acylamino, acyloxy, alkyl, halides, and the like.

As used herein, the term "heterocycle" or "heterocyclyl" refers to a monocyclic or polycyclic heterocyclic ring that is either a saturated ring or an unsaturated non-aromatic ring. Typically, the heterocycle may include 3-membered to 14-membered rings. In some cases, 3-membered heterocycle can contain up to 3 heteroatoms, and a 4-to 14-membered heterocycle can contain from 1 to about 8 heteroatoms. Each heteroatom can be independently selected from nitrogen, which can be quaternized; oxygen; and sulfur, including sulfoxide and sulfone. The heterocycle may be attached via any heteroatom ring atom or carbon ring atom. Representative heterocycles include morpholinyl, thiomorpholinyl, pyrrolidinonyl, pyrrolidinyl, piperidinyl, piperazinyl, hydantoinyl, valerolactamyl, oxiranyl, oxetanyl, tetrahydrofuranyl, tetrahydropyranyl, tetrahydropyrindinyl, tetrahydropyrimidinyl, tetrahydrothiophenyl, tetrahydrothiopyranyl, and the like. A heteroatom may be substituted with a protecting group known to those of ordinary skill in the art, for example, the hydrogen on a nitrogen may be substituted with a tert-butoxycarbonyl group. Furthermore, the heterocyclyl may be optionally substituted with one or more substituents (including without limitation a halogen atom, an alkyl radical, or aryl radical). Only stable isomers of such substituted heterocyclic groups are contemplated in this definition.

As used herein, the term "heteroaromatic" or "heteroaryl" means a monocyclic or polycyclic heteroaromatic ring (or radical thereof) comprising carbon atom ring members and one or more heteroatom ring members (such as, for example, oxygen, sulfur or nitrogen). Typically, the heteroaromatic ring has from 5 to about 14 ring members in which at least 1 ring member is a heteroatom selected from oxygen, sulfur, and nitrogen. In another embodiment, the heteroaromatic ring is a 5 or 6 membered ring and may contain from 1 to about 4 heteroatoms. In another embodiment, the heteroaromatic ring system has a 7 to 14 ring members and may contain from 1 to about 7 heteroatoms. Representative heteroaryls include pyridyl, furyl, thienyl, pyrrolyl, oxazolyl, imidazolyl, indolizinyl, thiazolyl, isoxazolyl, pyrazolyl, isothiazolyl, pyridazinyl, pyrimidinyl, pyrazinyl, triazinyl, triazolyl, pyridinyl, thiadiazolyl, pyrazinyl, quinolyl, isoquniolyl, indazolyl, benzoxazolyl, benzofuryl, benzothiazolyl, indolizinyl, imidazopyridinyl, isothiazolyl, tetrazolyl, benzimidazolyl, benzoxazolyl, benzothiazolyl, benzothiadiazolyl, benzoxadiazolyl, carbazolyl, indolyl, tetrahydroindolyl, azaindolyl, imidazopyridyl, qunizaolinyl, purinyl, pyrrolo[2,3]pyrimidyl, pyrazolo[3,4]pyrimidyl, benzo(b)thienyl, and the like. These heteroaryl groups may be optionally substituted with one or more substituents.

Suitable substituents for various groups described herein, e.g., alkyl, alkoxy, alkyl sulfanyl, alkylamino, dialkylamino, alkylene, alkenyl, alkynyl, cycloalkyl, cycloalkenyl, heterocyclyl, aryl, aralkyl, heteroaryl, and heteroarylalkyl groups, include any substituent that will form a stable compound. Examples of substituents include alkyl, alkoxy, alkyl sulfanyl, alkylamino, dialkylamino, alkenyl, alkynyl, cycloalkyl, an cycloalkenyl, an heterocyclyl, an aryl, an heteroaryl, an aralkyl, an heteroaralkyl, a haloalkyl, —C(O)NR$^a$R$^b$, —NR$^c$C(O)R$^d$, halo, —OR$^c$, cyano, nitro, haloalkoxy, —C(O)R$^c$, —NR$^a$R$^b$, —SR$^c$, —C(O)OR$^c$, —OC(O)R$^c$, —NR$^c$C(O)NR$^a$R$^b$, OC(O)NR$^a$R$^b$, NR$^c$C(O)OR$^d$, S(O)$_p$R$^c$, or —S(O)$_p$NR$^a$R$^b$, wherein R$^a$ and R$^b$, for each occurrence are, independently, H, an optionally substituted alkyl, an optionally substituted alkenyl, an optionally substituted alkynyl, an optionally substituted cycloalkyl, an optionally substituted cycloalkenyl, an optionally substituted heterocyclyl, an optionally substituted aryl, an optionally substituted heteroaryl, an optionally substituted aralkyl, or an optionally substituted heteroaralkyl; or R$^a$ and R$^b$ taken together with the nitrogen to which they are attached form optionally substituted heterocyclyl or optionally substituted heteroaryl; and R$^c$ and R$^d$ for each occurrence are, independently, H, an optionally substituted alkyl, an optionally substituted alkenyl, an optionally substituted alkynyl, an optionally substituted cycloalkyl, an optionally substituted cycloalkenyl, an optionally substituted heterocyclyl, an optionally substituted aryl, an optionally substituted heteroaryl, an optionally substituted aralkyl, or an optionally substituted heteroaralkyl. In addition, alkyl, cycloalkyl, alkylene, heterocyclyl, and any saturated portion of an alkenyl, cycloalkenyl, alkynyl, aralkyl, or heteroaralkyl group, may also be substituted with =O, =S, or =NR$^c$.

Choices and combinations of substituents and variables envisioned by embodiments described herein are only those that result in the formation of stable compounds. The term "stable" refers to compounds which possess stability sufficient to allow manufacture and which maintains the integrity of the compound for a sufficient period of time to be useful for the purposes detailed herein. Typically, such compounds are stable at a temperature of 40° C. or less, in the absence of excessive moisture, for at least one week. Such choices and combinations will be apparent to those of ordinary skill in the art and may be determined without undue experimentation.

Unless indicated otherwise, the compounds described herein containing reactive functional groups (such as, without limitation, carboxy, hydroxy, and amino moieties) also include protected derivatives thereof. "Protected derivatives" are those compounds in which a reactive site or sites are blocked with one or more protecting groups. Suitable protecting groups for carboxy moieties include benzyl, tert-butyl, and the like. Suitable protecting groups for amino and amido groups include acetyl, tert-butoxycarbonyl, benzyloxycarbonyl, and the like. Suitable protecting groups for hydroxy include benzyl and the like. Other suitable protecting groups are well known to those of ordinary skill in the art and include those found in T. W. Greene, PROTECTING GROUPS IN ORGANIC SYNTHESIS, John Wiley & Sons, Inc. 1981, the entire teachings of which are incorporated herein by reference for all purposes.

Compounds described herein may also be in salt form. Illustrative salts include, but are not limited, to sulfate, citrate, acetate, oxalate, chloride, bromide, iodide, nitrate, bisulfate, phosphate, acid phosphate, isonicotinate, lactate, salicylate, acid citrate, tartrate, oleate, tannate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate, and pamoate (i.e., 1,1' methylene bis (2 hydroxy 3 naphthoate)) salts. In some cases, the salt may be formed from a compound described herein having an acidic functional group, such as a carboxylic acid functional group, and an inorganic or organic base. Suitable bases include, but are not limited to, hydroxides of alkali metals such as sodium, potassium, and lithium; hydroxides of alkaline earth metal such as calcium and magnesium; hydroxides of other metals, such as aluminum and zinc; ammonia, and organic amines, such as unsubstituted or hydroxy substituted mono, di, or trialkylamines; dicyclohexylamine; tributyl amine; pyridine; N methyl, N ethylamine; diethylamine; triethylamine; mono, bis, or tris (2 hydroxy lower alkyl amines), such as mono, bis, or tris (2 hydroxyethyl)-amine, 2 hydroxy tert butylamine, or tris (hydroxymethyl)methylamine, N, N, di lower alkyl N (hydroxy lower alkyl) amines, such as N,N dimethyl N (2 hydroxyethyl)-amine, or tri (2 hydroxyethyl)amine; N methyl D glucamine; and amino acids such as arginine, lysine, and the like.

In some cases, the salt may be prepared from a compound described herein having a basic functional group, such as an amino functional group, and an inorganic or organic acid. Suitable acids include, but are not limited to, hydrogen sulfate, citric acid, acetic acid, oxalic acid, hydrochloric acid, hydrogen bromide, hydrogen iodide, nitric acid, phosphoric acid, isonicotinic acid, lactic acid, salicylic acid, tartaric acid, ascorbic acid, succinic acid, maleic acid, besylic acid, fumaric acid, gluconic acid, glucaronic acid, saccharic acid, formic acid, benzoic acid, glutamic acid, methanesulfonic acid, ethanesulfonic acid, benzenesulfonic acid, and p-toluenesulfonic acid.

EXAMPLES

Example 1—Synthesis of Triptycene PEEK Polymers (Trp-PEEK)

Triptycene diol 1 can be synthesized in large scale via the Diels-Alder reaction between benzoquinone and anthracene as shown in FIG. 1C. Treatment of the resulting adduct with cat. HBr in acetic acid yields 1 in good yields.

Figure 2:
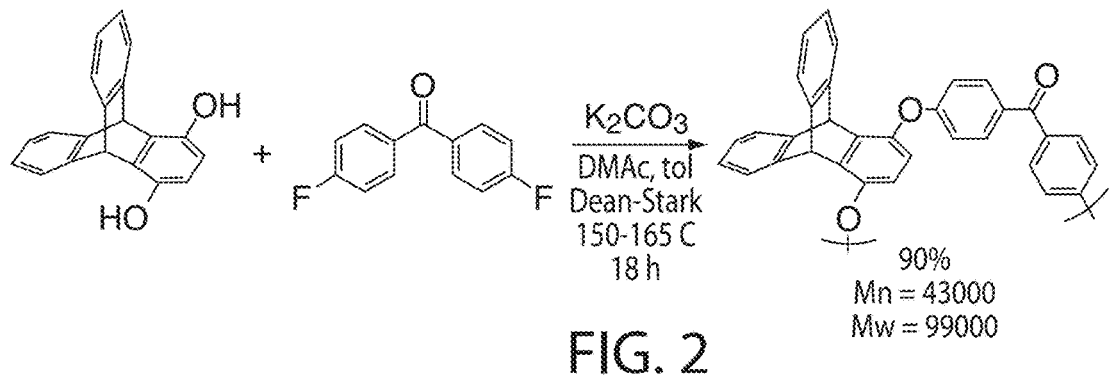
FIG. 2 shows the synthesis of Trp-PEEK, according to one set of embodiments.
Figure 3:
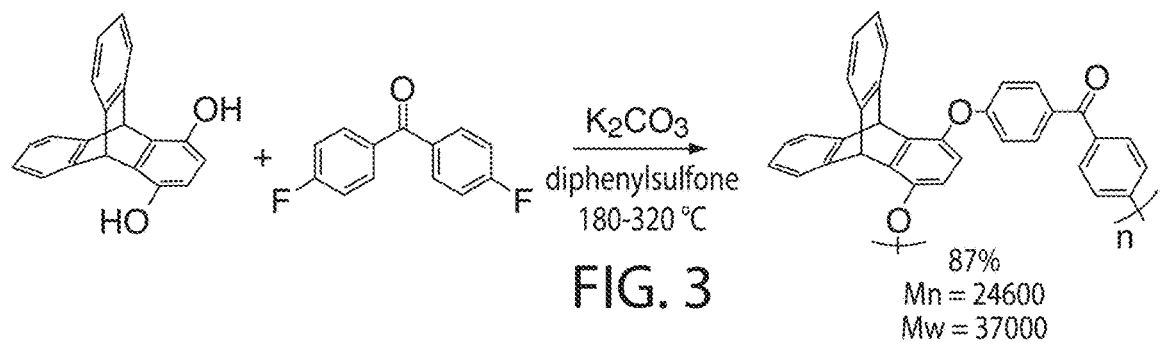
FIG. 3 shows the industry PEEK synthesis conditions to synthesize Trp-PEEK, according to one set of embodiments.
Figure 4:
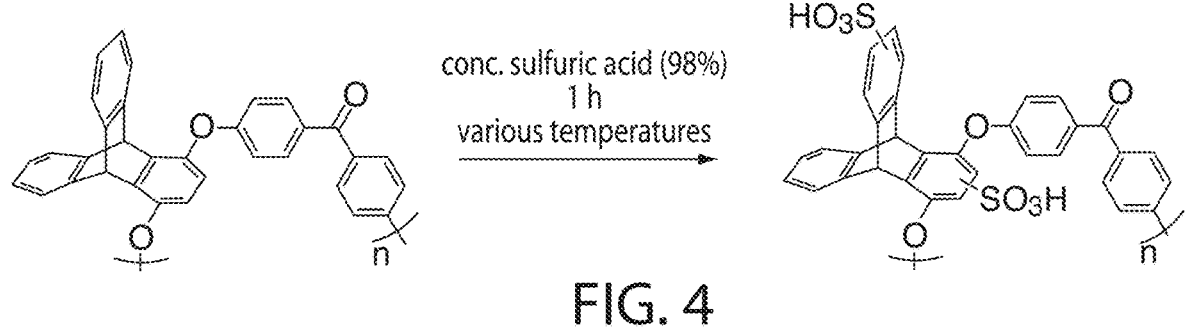
FIG. 4 shows the synthesis of sulfonic acid containing triptycene PEEK (S-Trp-PEEK), according to one set of embodiments.

$S_NAr$ polymerization may require highly accurate stoichiometry to obtain pure monomer. Thus, the Diels-Alder adduct was recrystallized prior to tautomerization into the hydroquinone. Further purification of 1 can be achieved by recrystallization in acetone. After extensive purification, Triptycene diol 1 was used as a monomer in an $S_NAr$ polymerization with 4,4'-difluorobenzophenone to produce Trp-PEEK, as shown in FIG. 2.

Trp-PEEK displayed slight solubility in THF, DMF, and DMAc, and complete solubility in dichloromethane and hot NMP. The molecular weight of the polymer was determined by GPC. When conditions similar to those used to synthesize commercial PEEK were used to synthesize Trp-PEEK, lower molecular weights were obtained (FIG. 1C). This was attributed to the lack of solubility of triptycene diol in diphenylsulfone, even at high temperatures. It is likely that under the industrial conditions, the hydroquinone monomer melts, aiding its mixture with the difluorobenzophenone co-monomer. Triptycene diol melts at around 330° C., which is close to its decomposition temperature.

Even when accounting for the increased mass of the triptycene, the synthesis of Trp-PEEK resulted in polymer of greater chain lengths than commercial PEEK. Commercial PEEK is reported at possessing molecular weights of around 30,000 Da, which would give a chain length of around 100 repeat units. In the case of Trp-PEEK, chain length is estimated at around 210 repeat units.

Thermogravimetric analysis (TGA) of the polymer showed excellent thermal stability, decomposing at 550° C. under an atmosphere of $N_2$ and in air. Incorporating triptycene into the backbone of PEEK raised the glass transition temperature significantly, from 143° C. to 257° C.

Example 2—Synthesis of Sulfonic Acid Containing Triptycene PEEK Polymers

Figure 5A:
FIGS. 5A-5B show digital images of (A) a S-Trp-PEEK hydrogel and (B) as-produced S-Trp-PEEK, according to one set of embodiments.
Figure 5B:
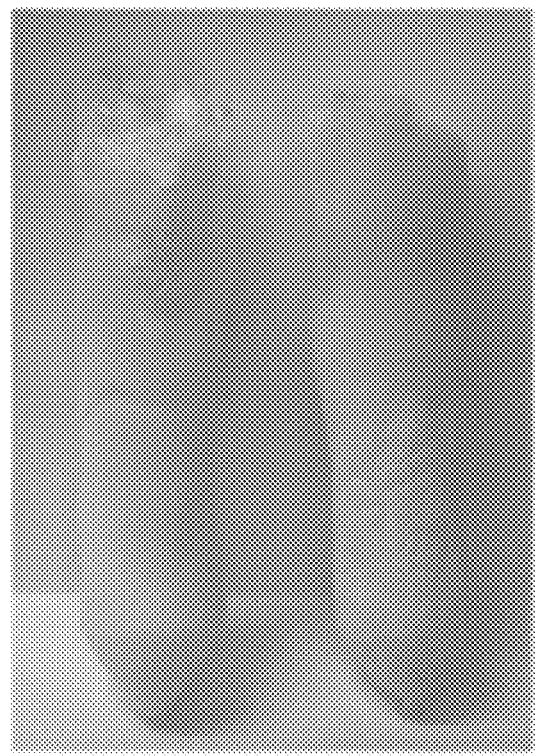

Sulfonic acid containing triptycene PEEK (S-Trp-PEEK) was synthesized by dissolution of Trp-PEEK in concentrated sulfuric acid and heating for 1 h at various temperatures. S-Trp-PEEK by visual inspection is a brittle yellow polymer foam, which differs significantly from the white powder of Trp-PEEK. It is soluble in MeOH, DMSO, DMF, and DMAc. When mixed with water, a hydrogel resulted (FIGS. 5A-5B); however, it is possible to obtain S-Trp-PEEK which is soluble is water by extending the reaction time of the sulfonation reaction to 12 h.

Table 1 shows the molecular weights of the starting Trp-PEEK material and S-Trp-PEEK's synthesized at various temperatures. The number in each sulfonated polymer refers to the temperature used in its synthesis. Unexpectedly, the lowest temperature conditions unexpectedly produces the smallest polymer. This may be attributable to solubility differences in the polymers. As DS decreases, so does solubility in polar organic solvents like the DMF used for GPC analysis. The higher molecular weight fraction of S-Trp-PEEK45 may not be solubilized by DMF. This assertion is supported by the fact that a visual inspection of S-Trp-PEEK DMF solutions revealed that of the three sulfonated derivatives, only S-Trp-PEEK45 formed a cloudy solution.

TABLE 1

Molecular weights of Trp-PEEK and its sulfonated derivatives.

| Polymer | $M_n$ | $M_w$ | PDI | Degree of Sulfonation |
|---|---|---|---|---|
| Trp-PEEK | 43000 | 99000 | 2.28 | 0 |
| S-Trp-PEEK-45 | 22400 | 37000 | 1.66 | 1.46 |
| S-Trp-PEEK-65 | 32000 | 59000 | 1.83 | 1.53 |
| S-Trp-PEEK-85 | 32000 | 55000 | 1.71 | 1.67 |

Figure 6:
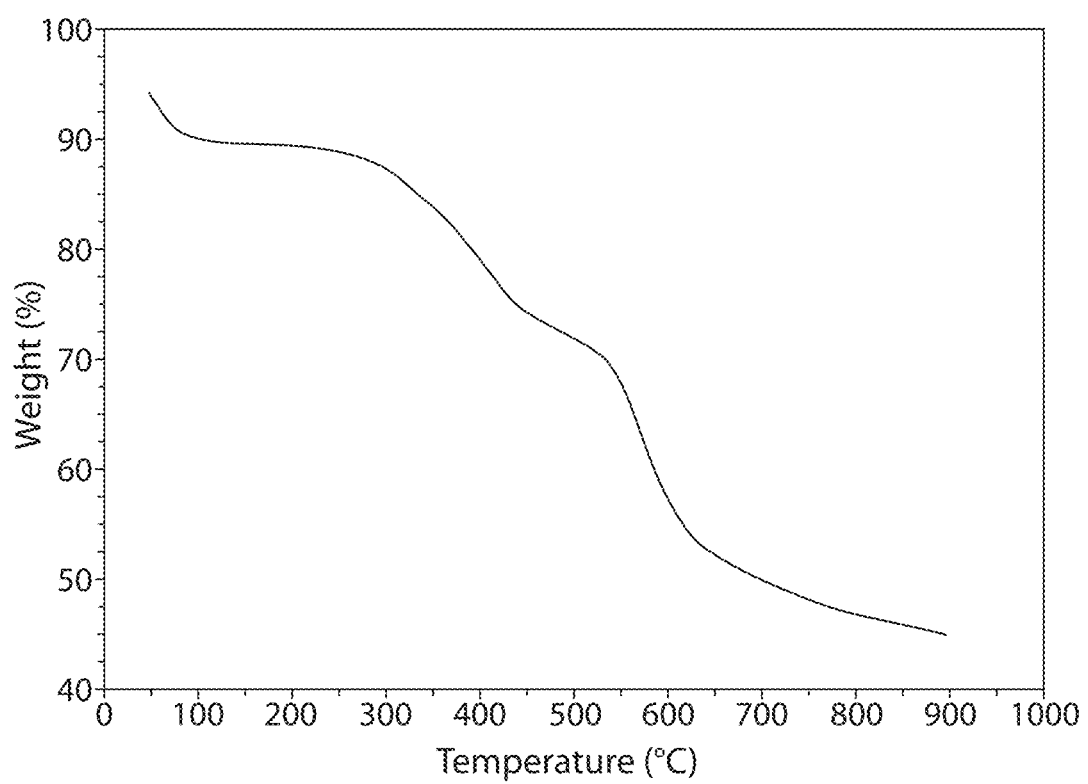
FIG. 6 shows a representative thermogravimetric analysis (TGA) curve of S-Trp-PEEK, according to one set of embodiments.

Degrees of sulfonation (DS) in the sulfonated materials were determined by TGA. DS represents the average number of sulfonate groups per repeat unit of the polymer. Previous studies have shown that TGA data provides accurate measurements of sulfonation in PEEK type polymers. The TGA curve shown in FIG. 6 shows a typical S-Trp-PEEK decomposition. The curve is characterized by two distinct decomposition events. The first, at ~300° C., can be attributed to the thermolysis of $SO_3$ groups. The second decomposition event at ~550° C. may be assigned to the thermolysis of the polymer backbone. By knowing the percent weight loss which can be attributed to the sulfonic acid groups in the polymer, the degree of sulfonation can be determined by the following equation:

$$DS = \frac{5.81 * \Delta\text{wt } \%_{sulfonate}}{\text{wt } \%_i - \Delta\text{wt } \%_{sulfonate}}$$

Similar to PEEK, increase in temperature was observed to correlate with the degree of sulfonation in Trp-PEEK (Table 1). Incorporating a triptycene into the backbone allowed for the installation of a larger number of sulfonate groups per repeat unit. For PEEK, fractional sulfonation per repeat unit only approached 1 at either very long reaction times (over 50 h at 35° C.), or at high temperatures (6 h at 75° C.). 1.4 sulfonic acid groups per repeat unit could easily be achieved after reaction for 1 h at 45° C. This may be attributable to the two aryl rings on the triptycene unit, as sulfonation of the deactivated benzophenone aryl groups is unfavored.

Example 3—S-Trp-PEEK as Proton Exchange Membrane Material

Figure 7:
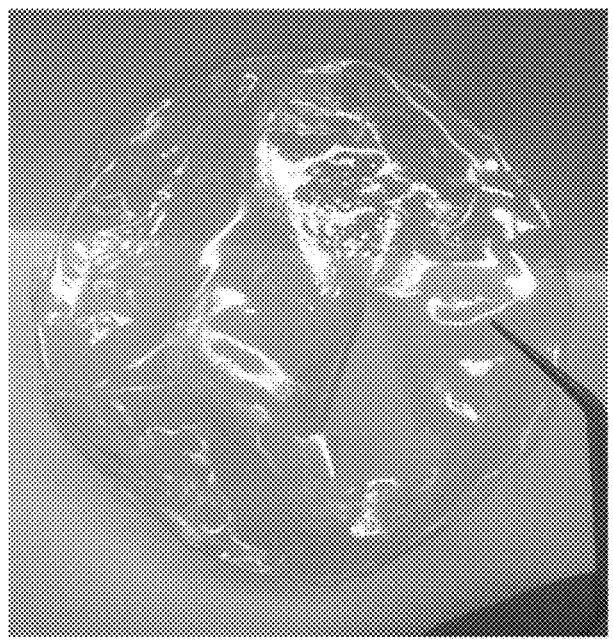
FIG. 7 is a photograph of a S-Trp-PEEK membrane cast from a 7% wt/v DMAc solution.

S-Trp-PEEK was cast into robust transparent membranes from DMAc, DMF, and MeOH, as shown in FIG. 7.

7% w/v DMF solutions of each S-Trp-PEEK polymer (45, 65, and 85) were made. These solutions were cast into Teflon wells and dried overnight at 70° C. under vacuum. The resulting films were removed by adding a small amount of DI water to the wells and peeling off the film. After soaking the films in DI water for 2 h, the proton conductivity of the hydrated films were obtained using impedance spectroscopy.

Figure 8:
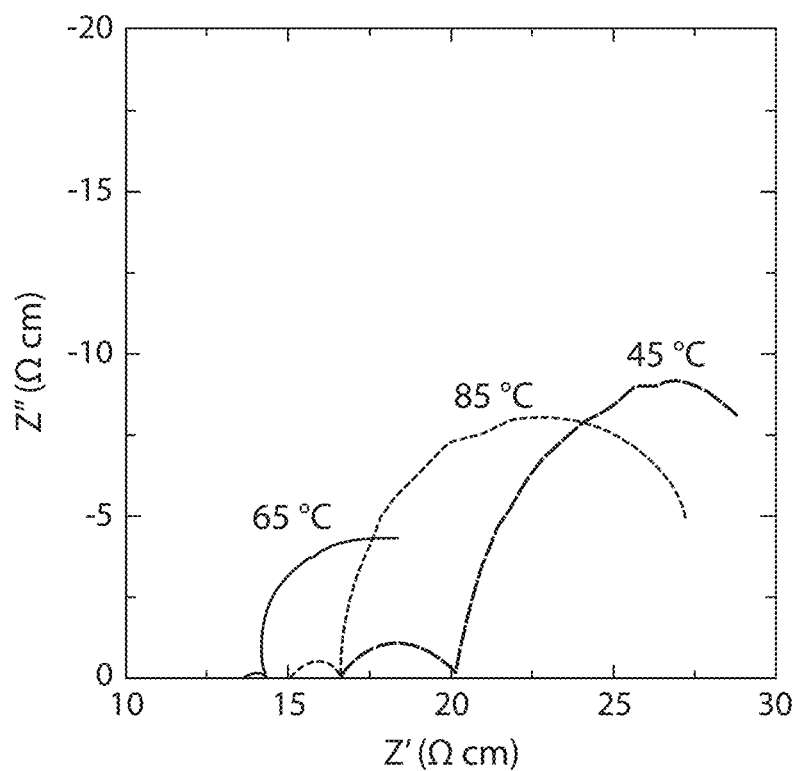
FIG. 8 shows Nyquist plots of the S-Trp-PEEK polymers synthesized at 45, 65, and 85° C., according to one set of embodiments. The point at which each curve crosses the x-axis the first time corresponds to the proton resistivity of the material.
Figure 9:
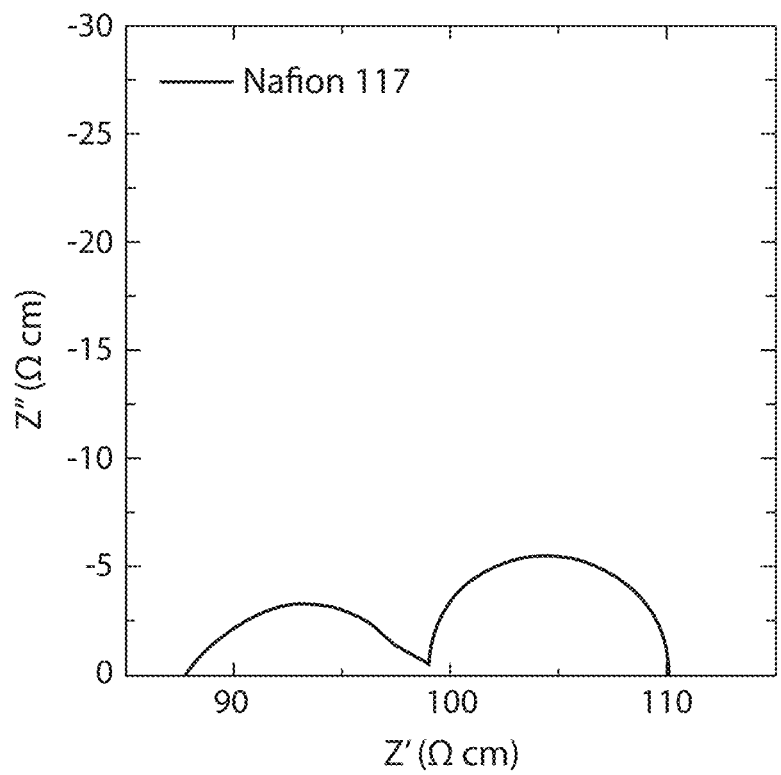
FIG. 9 shows the Nyquist plot of Nafion film, according to one set of embodiments.

FIG. 8 shows Nyquist plots of the three S-Trp-PEEK materials. Of the three, the S-Trp-PEEK65 showed the greatest proton conductivity. This is unexpected, as degree of sulfonation typically correlates with conductivity. To compare the performance of these materials to the current industry standard Nafion was tested within the experimental setup. FIG. 9 shows that under testing conditions identical to those used on S-Trp-PEEK, Nafion had a resistivity of 88Ω, placing it well below S-Trp-PEEK in proton conduction performance (S-Trp-PEEK45=17Ω; S-Trp-PEEK65=13Ω; S-Trp-PEEK85=15Ω).

Figure 10:
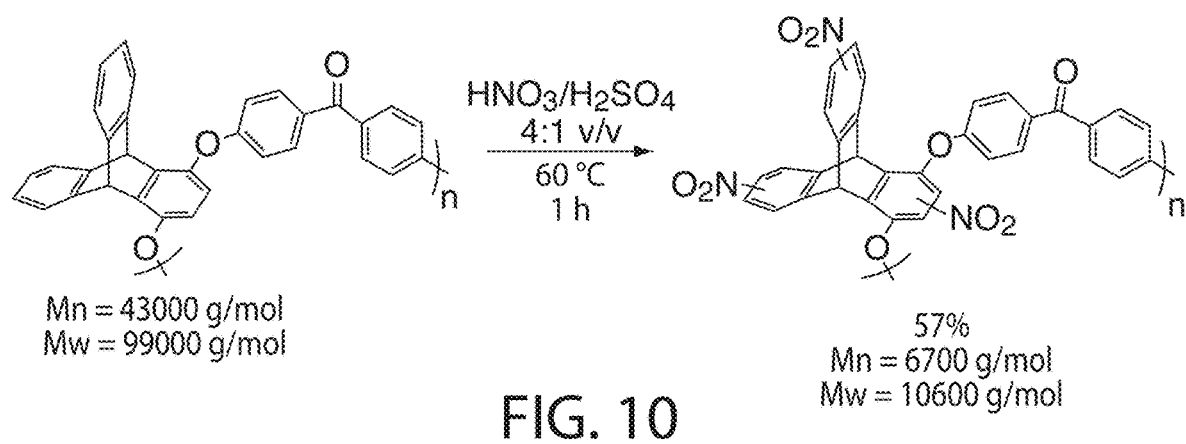
FIG. 10 shows the nitration of Trp-PEEK at elevated temperatures, according to one set of embodiments, resulting in significant reduction of the molecular weight.

Example 4—Preparation of Urea/Thiourea Containing Triptycene Poly(Ether Ether Ketone)s and their Use as Selectors for Chemiresistive Sensing and Elastic Materials Nitration of PEEK based materials can be used to functionalize these polymers post-polymerization. Nitration is typically carried out under standard electrophilic aromatic substitution conditions: PEEK is dissolved in conc. sulfuric acid and nitric acid is added. When these conditions were implemented on Trp-PEEK, it was found that they resulted in significant reduction of the molecular weight of the starting material (FIG. 10).

Like sulfonation, nitration of PEEK materials can be estimated by TGA. By TGA it was determined that the conditions shown in FIG. 10 results in 2.85 nitro groups per repeat unit. It is likely that nitration occurs first on the electron rich hydroquinone, and then on the other two aryl rings of the triptycene. Nitration of the benzophenone is possible, but less likely, due to deactivation by the carbonyl.

Figure 11:
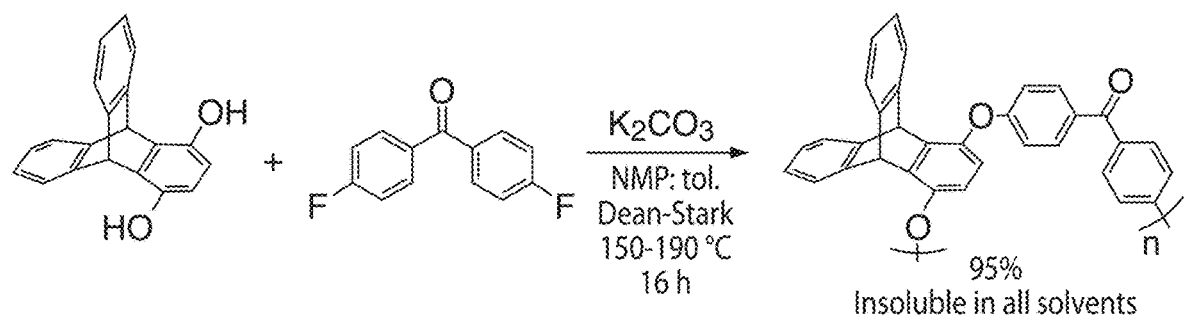
FIG. 11 shows the synthesis of Trp-PEEK-NMP, according to one set of embodiments.

If the lowering of molecular weight is inherent in the nitration procedure, by supplying high molecular weight Trp-PEEK as starting material, the resulting nitrated polymer will be of a similar high molecular weight. Therefore, in an attempt to produce nitrated materials of higher molecular weights, a new synthesis of Trp-PEEK was attempted. To achieve this, NMP was substituted for DMAc as a solvent due to its similar solvation qualities and higher boiling point. The temperature of the reaction can then be raised from 163° C. to 190° C., which should not only accelerate the kinetics of the $S_NAr$ polymerization, but more effectively solvate higher-molecular weight polymer and allow for the formation of longer polymer chains (FIG. 11). The resulting polymer was insoluble in all tested solvents, suggesting an increased molecular weight relative to polymer synthesized in DMAc.

By visual inspection, unlike when the polymerization was carried out in DMAc, the polymer was fully solvated at the end of the reaction. The resulting white polymeric material was found to be completely insoluble in THF and DMF, the two solvents used of GPC characterization. Therefore, it is not possible to obtain a molecular weight in the normal manner. However, based on the qualitative properties of this reaction when compared to the Trp-PEEK synthesized in DMAc it is likely that a molecular weight in excess of 100,000 Da was achieved.

TABLE 2

Degrees of nitration on Trp-PEEK-NMP when dispersed and stirred in 4:1 v/v conc. $HNO_3$: conc. $H_2SO_4$ for 1 h at various temperatures and the solubilities of the resulting polymers.

| Temperature | Degree of Nitration | Soluble in THF/DMF? |
|---|---|---|
| 0° C. | 0 | No |
| 25° C. | 0 | No |
| 25° C. (3 h) | 0 | No |
| 25° C. (6 h) | 0 | No |
| 35° C. | 0 | No |
| 45° C. | .13 | No |
| 55° C. | .33 | No |
| 65° C. | .68 | No |
| 75° C. | 1.10 | No |

When Trp-PEEK-NMP was submitted to nitration conditions at various temperatures for 1 h, it was found that nitration did not occur until 45° C. and the degree of nitration steadily increased as the temperature of the reaction was raised (Table 2). However, even the most nitrated polymer was not soluble in the GPC solvents, THF and DMF, which prevented the determination of molecular weight. The marked contrast in reactivity between this high molecular weight polymer and the previous Trp-PEEK was likely due to solubility differences. The nitration reaction was carried out in dispersion, and it is likely the tightly wrapped chains of the high molecular weight Trp-PEEK-NMP only provide a limited number of reactive sites on the outside of the colloid particle.

Figure 12:
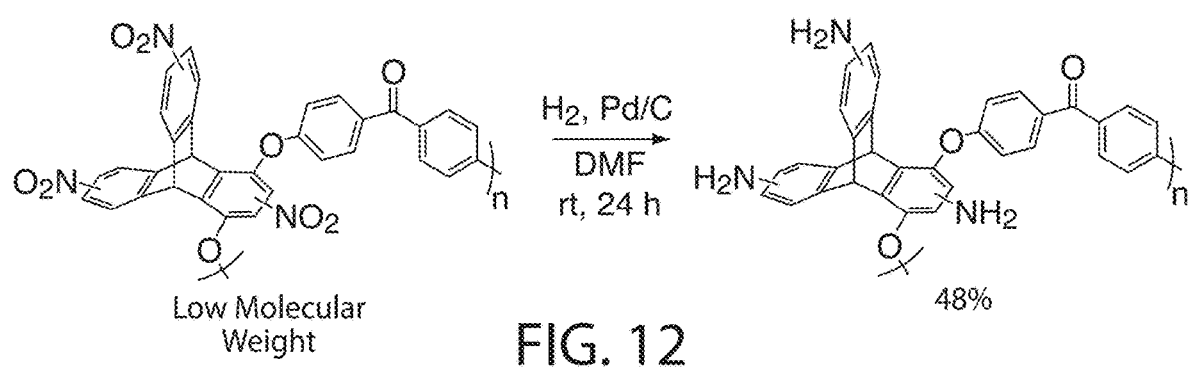
FIG. 12 shows the reduction of NO$_2$-Trp-PEEK to NH$_2$-Trp-PEEK, according to one set of embodiments.

Reduction of the low molecular weight $NO_2$-Trp-PEEK into $NH_2$-Trp-PEEK was carried out by treatment with $H_2$ and Pd/C, ammonium formate and Pd/C, or with sodium dithionite (FIG. 12). Complete reduction of the nitro groups is suggested by the disappearance of the $NO_2$ stretch by IR (FIG. 8.12). As $NH_2$-Trp-PEEK is decorated with nucleophilic amine groups, further functionalization by treatment with appropriate electrophiles can lead to a wide variety of materials. Alternate successful conditions include the use of ammonium formate in place of hydrogen gas, and sodium dithionite.

Figure 13:
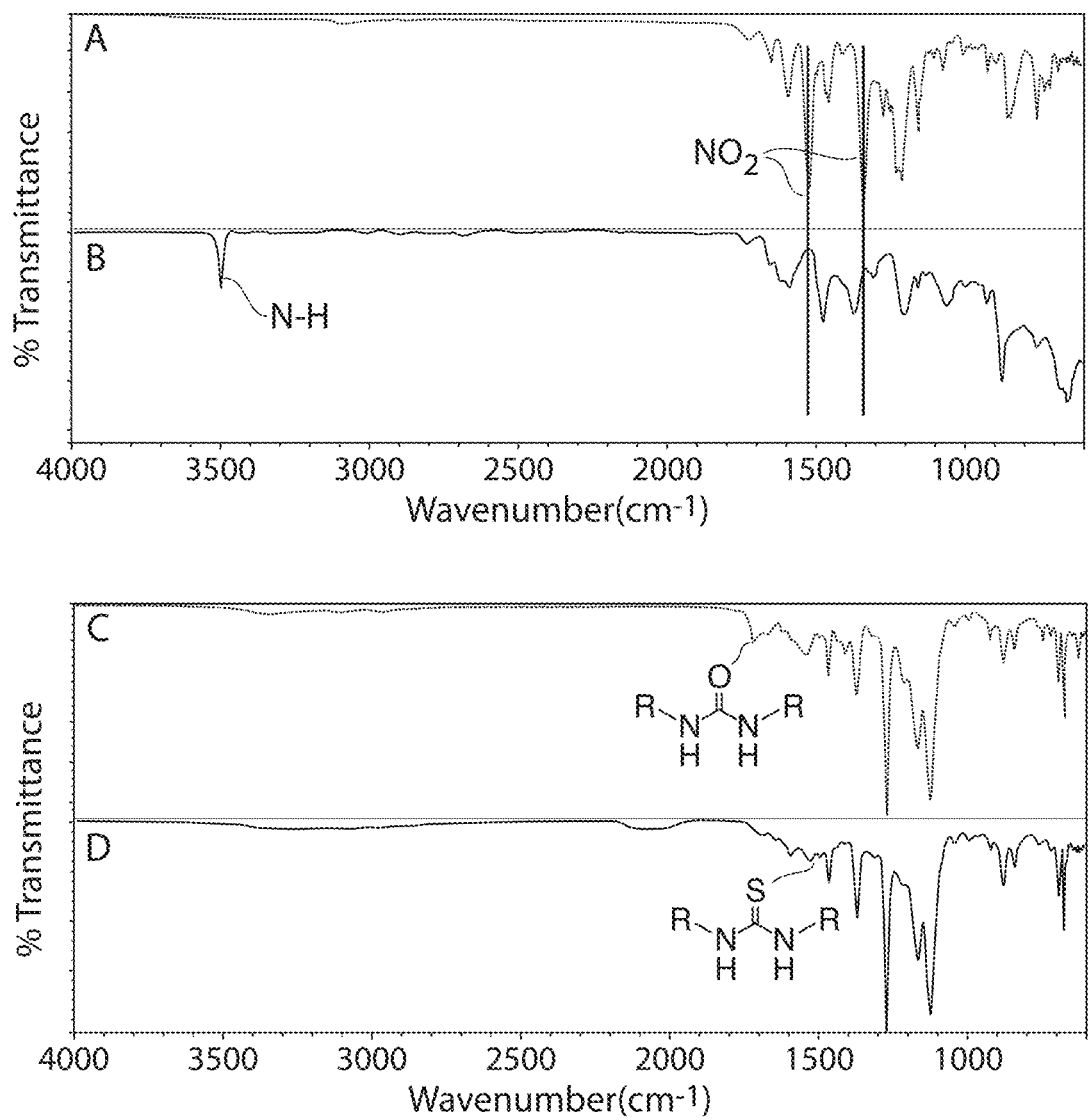
FIG. 13 shows IR spectra of A) NO$_2$-Trp-PEEK, B) NH$_2$-Trp-PEEK, C) Urea-Trp-PEEK, D) Thiourea-Trp-PEEK, according to one set of embodiments. Diagnostic stretches are highlighted.
Figure 14:
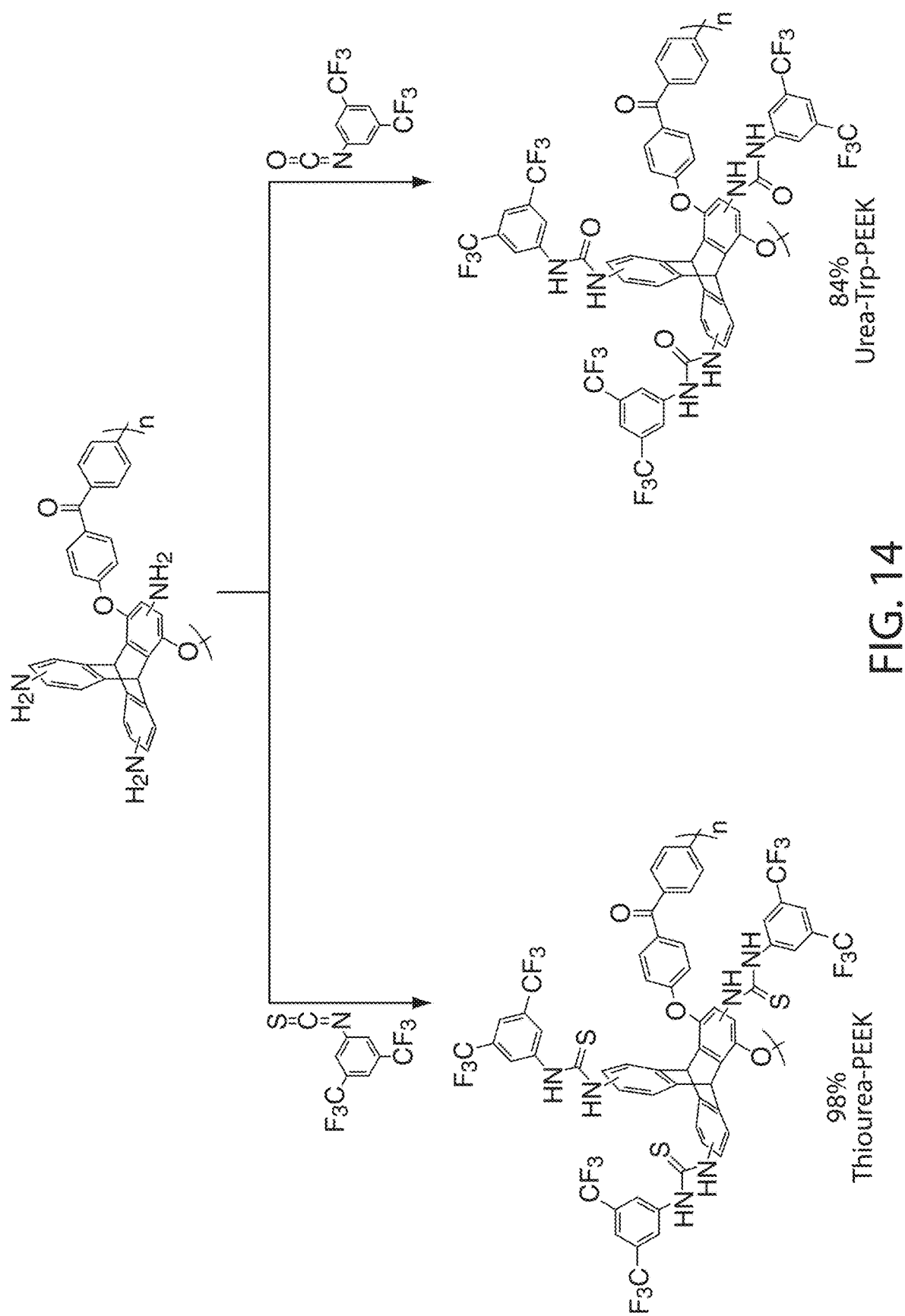
FIG. 14 shows the synthesis of Thiourea-Trp-PEEK and Urea-Trp-PEEK, according to one set of embodiments.

FIG. 14 summarizes how $NH_2$-Trp-PEEK was reacted with 3,5-trifluoromethyl phenylisocyanate or 3,5-trifluoromethylphenylthioisocyanate to give the corresponding urea and thiourea structures. IR reveals carbonyl and thiocarbonyl stretches in these materials (FIG. 13). After reduction, the $NO_2$ stretches in $NO_2$-Trp-PEEK disappear and N—H stretches in the resulting polymer can be seen.

Example 5—Urea/Thiourea Trp-PEEK as a Selector for Chemiresistive Sensing of Acetone Electron-deficient diaryl ureas and thioureas may be used as selectors for both the fluorescence-based and chemiresistive sensing of cyclohexanone, an important marker for the energetic material RDX.

Acetone is important bio-marker for diabetes, as diabetic patients may exhale higher concentrations of acetone in their breath than individuals without diabetes. Breath analysis can therefore offer an unobtrusive diagnosis of this disease. In contrast to GC-MS, chemiresistive carbon nanotube based gas-sensors are a low cost, portable alternative, which can be easily used by non-experts. This type of sensor operates by applying a voltage across a carbon nanotube film, which links two conductive electrodes. When the film is exposed to an appropriate analyte, the current across it is altered. This change can be attributed to, for example, doping effects and/or swelling/contraction of the nanotube network. By monitoring these changes, exposure to various analytes can be quantified. A critical component of these sensors is a selector. Selectors are chemical additives which are mixed with the nanotubes and impart unique responses to various analytes. Selectors can either enhance or decrease the nanotubes' response to a particular analyte, or can create a response where one did not previously exist.

Figure 15:
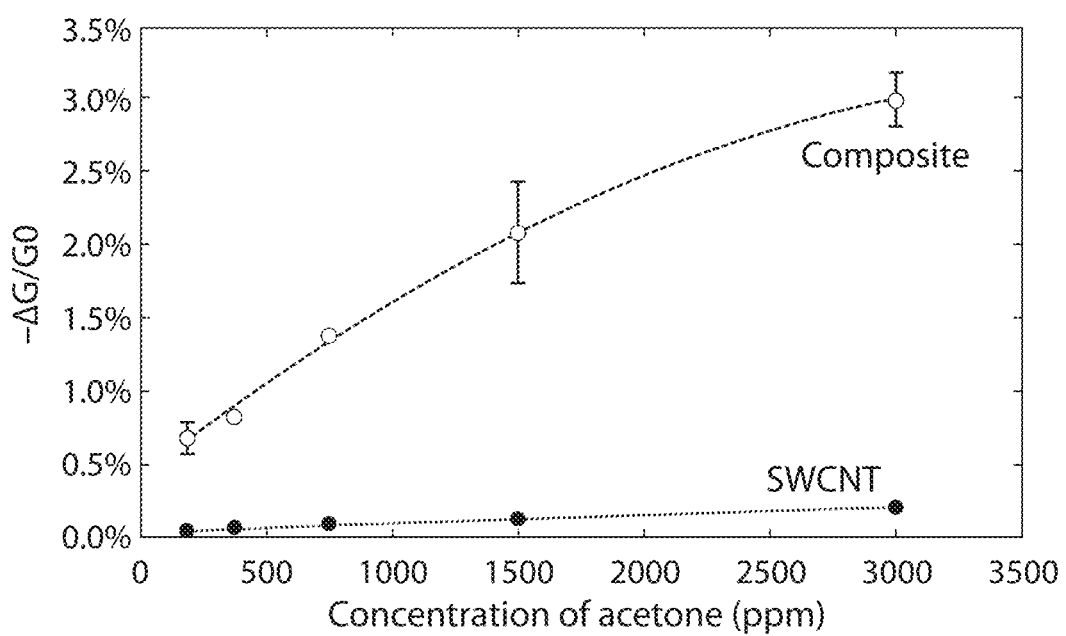
FIG. 15 shows response values for Thiourea-Trp-PEEK/SWCNT composite in the chemiresistive gas-phase sensing of acetone, according to one set of embodiments.

Urea-Tip-PEEK or Thiourea-Trp-PEEK was mixed with [6.5]SWCNT's at various weight ratios in DMF and briefly sonicated. This resulting dispersions were dropcast onto gold electrodes and allowed to dry under vacuum. When these films were exposed to acetone vapor, they showed a greatly increased response relative to pristine SWCNT's. While both urea and thiourea polymers elicited a response, the best performer was the Thiorea-Trp-PEEK mixed with SWCNT's at a 6:1 w/w ratio. The performance of this material is shown in FIG. 15. More work is required for the optimization of this sensor, but these data show that Thiourea-Trp-PEEK is a promising material for the gas-phase sensing of acetone.

Example 6—Mechanical Properties of Urea/Thiourea Trp-PEEK Poly(THF) Composites

Figure 16:
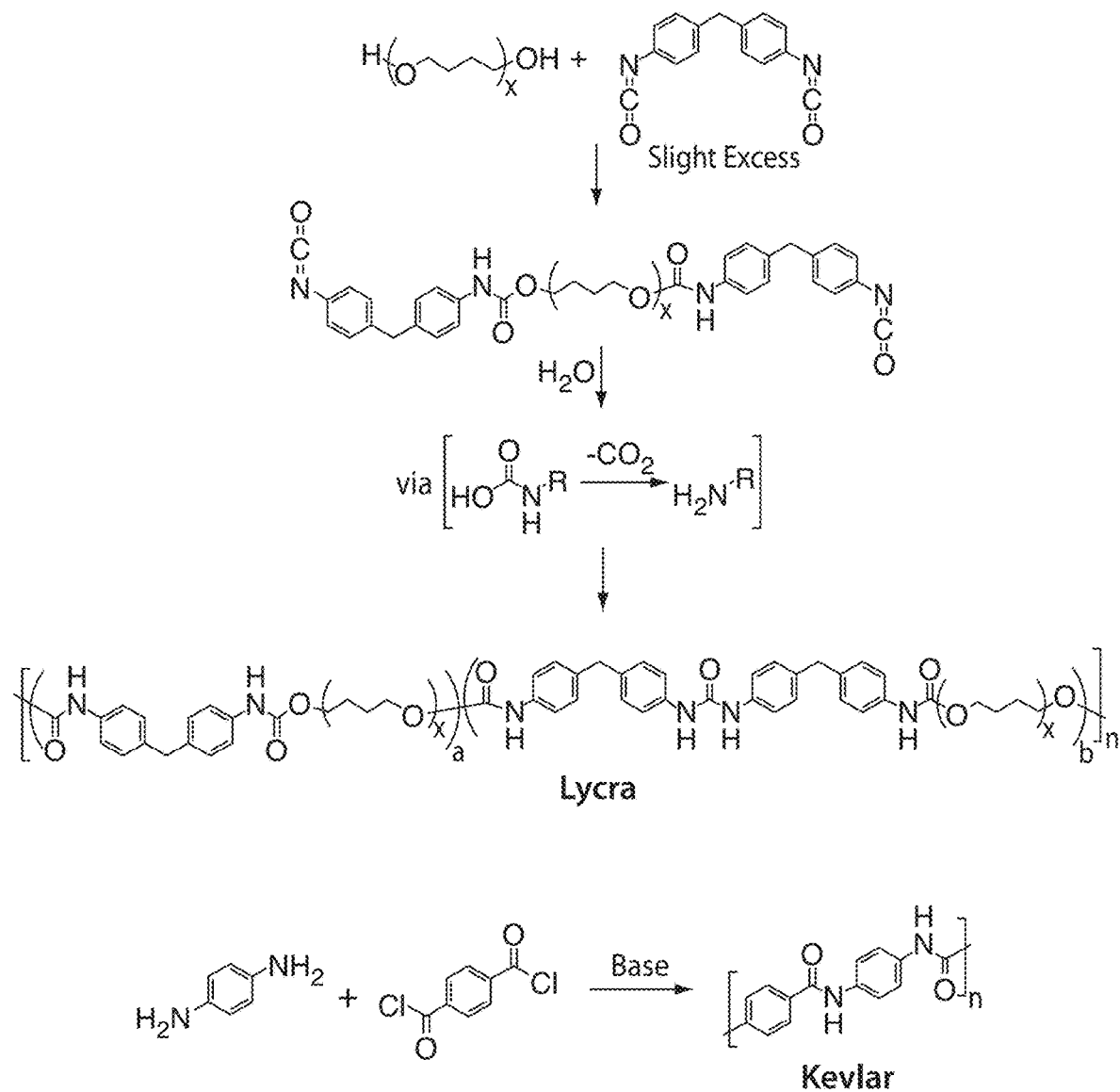
FIG. 16 shows the synthesis and structure of Lycra and Kevlar, according to one set of embodiments.
Figure 17:
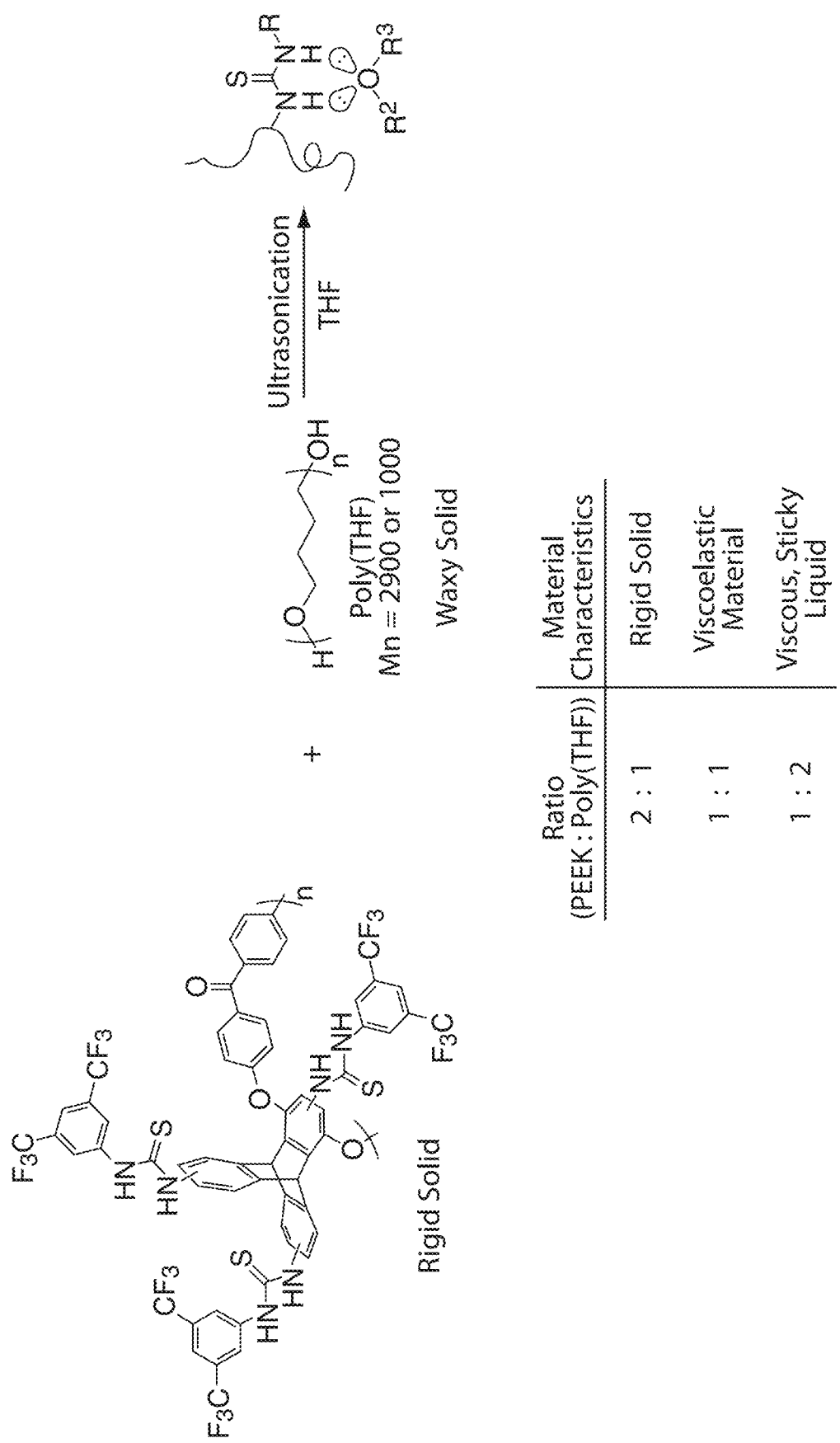
FIG. 17 shows a summary of the physical properties of composites containing thiourea-Trp-PEEK and poly(THF) (Mw=1000 Da) at various ratios, according to one set of embodiments.
Figure 18A:
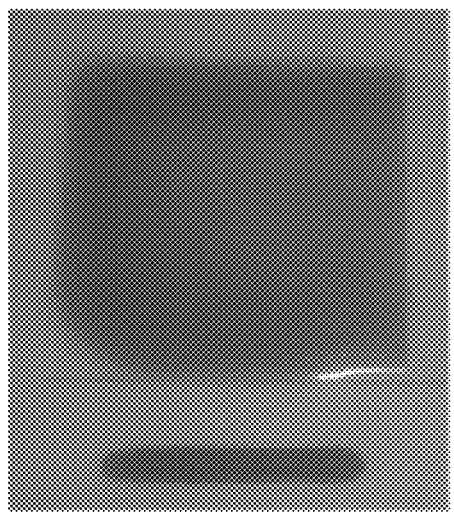
FIGS. 18A-C shows digital images of a material obtained when Thiourea-Trp-PEEK and poly(THF) are mixed in solution at a 1:1 mass ratio and cast into a film, according to one set of embodiments.
Figure 18B:
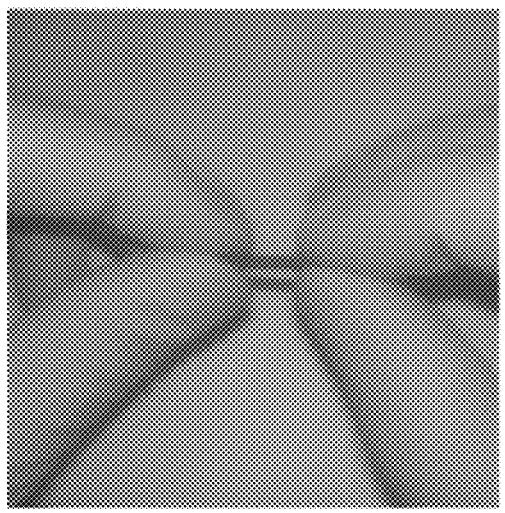
Figure 18C:
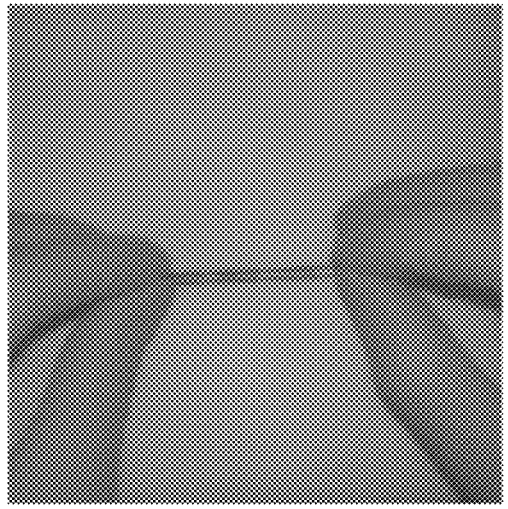

The bulk properties of polymers generally depends upon the forces which exist between polymer chains. In many cases, the most significant contribution to these interactions arise from hydrogen bonding. Lycra, the primary component of spandex, has two major domains which produce its strength and elasticity. While the polyglycol provides the degrees of freedom necessary to impart elastic behavior, the urea domain generally gives the material its strength. Similarly, it is the amide linkages in Kevlar, which can act as both hydrogen bond acceptors and donors, which generally form a rigid structure that allow for its widespread implementation in ballistic body armor (FIG. 16).

To explore the ability the Urea/Thiourea-Trp-PEEK polymers to form hydrogen bonding networks in polymer blends with poly(tetrahydrofuran) (poly(THF)), polymer composites were synthesized. Poly(THF) is a polyether derived from the acid-catalyzed polymerization of tetrahydofuran. Poly(THF) generally has the structure:

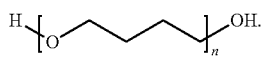

Most commonly used as a macromonomer is the synthesis of elastic fibers like Lycra and other polyurethanes, it is commercially available at narrow molecular weights between 500 and 2900 daltons, and is terminated by hydroxyl groups (FIG. 8). At room temperature, it is generally an inelastic waxy solid which melts at 28-35° C.

After mixing these polymers in various ratios, it was found that where the Thiourea-Trp-PEEK was previously a rigid solid, when mixed with poly(THF) in equal mass proportions in a THF solution, the resulting solution could be cast into a robust film with viscoelastic properties (FIG. 17, FIGS. 18A-C). Mass ratios near 1:1 were used to obtain such a material. When excessive amounts of Thiourea-Trp-PEEK are added, its mechanical properties dominated and viscoelasticity was lost. Similarly, when the composite was comprised of mostly poly(THF), a viscous sticky material was obtained.

Figure 19:
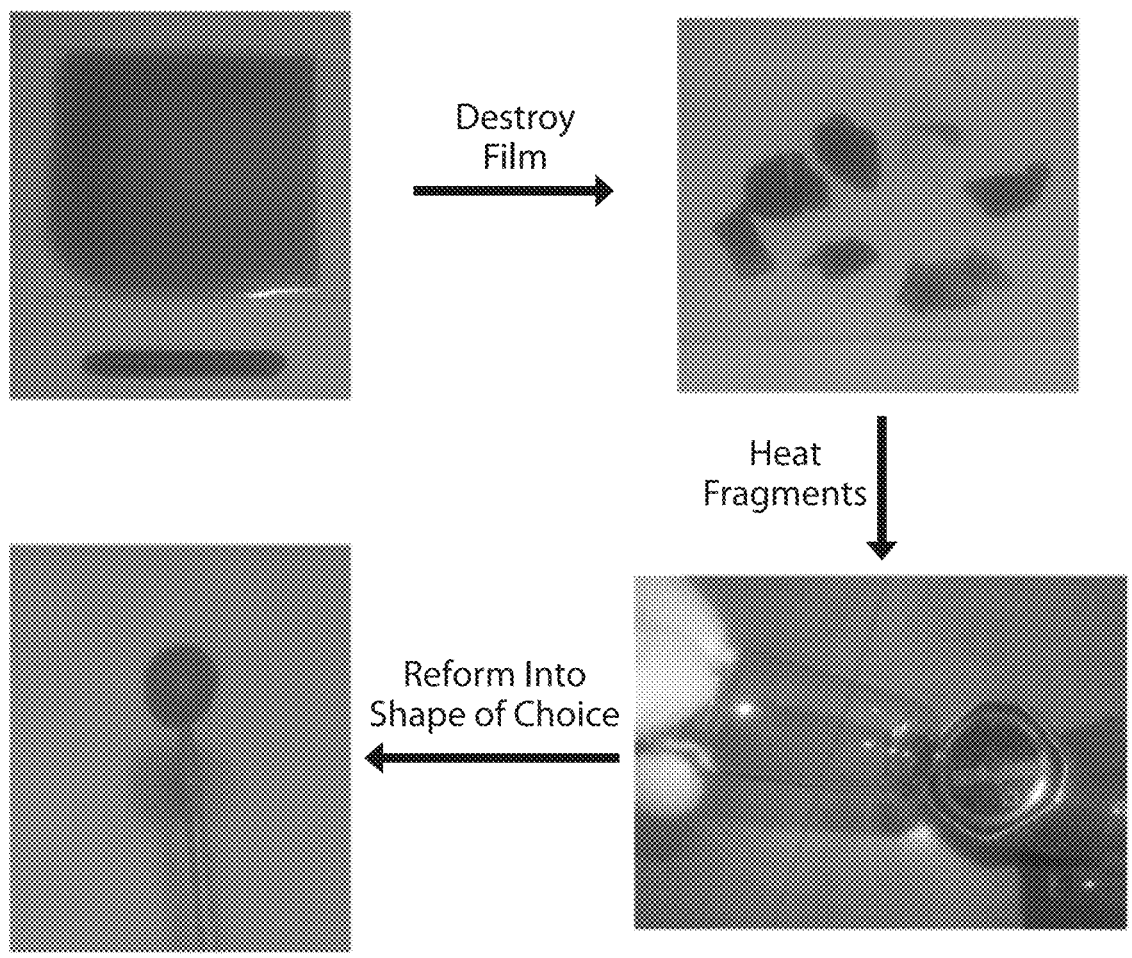
FIG. 19 shows the self-healing properties of thiourea-Trp-PEEK/poly(thf) composite, according to one set of embodiments. After destroying the film, the fragments were heated, which increased the ductility of the material. After doing so, the material was reshaped at will.

The viscoelastic materials obtained at a 1:1 w/w ratio also possessed self-healing properties. It could be deformed and reformed into numerous different shapes and orientations (FIG. 19). Heating the material increased its ductility significantly, and allowed for more precise manipulation. Interestingly, the Urea-Trp-PEEK did not produce a similar material as the Thiourea-Trp-PEEK, instead forming a hard, waxy solid when mixed with poly(THF).

Example 7—Experimental Methods

General Materials and Methods:

All chemicals were purchased from Sigma-Aldrich and used as received unless stated otherwise. Thermogravimetric analyses were performed on a TA Instruments Discovery TGA in the range of 50-800° C. at a constant ramp rate of 20° C. min$^{-1}$ under nitrogen atmosphere or air. Differential scanning calorimetry analyses were performed on a TA Instruments Discovery DSC at a scan rate of 10° C./min. Nuclear magnetic resonance (NMR) data was obtained on a Varian Inova-500 MHz NMR. Polymer molecular weights were determined using an HP series 1100 GPC system in DMF or THF (approx. 5 mg/mL sample concentration) and are relative to polystyrene standards or on Waters GPC in DMF (5 mg/mL sample concentration relative to PMMA standards.

Ionic Conductivity Measurements.

Membranes were made by casting from 7 wt % solutions of the polymer in dimethylformamide in a Teflon well and left to dry in the vacuum oven at 70° C. overnight. Membranes were then slightly hydrated with a drop of deionized water and peeled off from the well. The free standing membranes were then soaked in deionized water for at least 2 hours before any measurements. Proton conductivity was measured using a Solartron SI 1287 electrochemical interface coupled with a Solartron SI 1260 impedance/gain-phase analyzer. Films were placed across 4 platinum electrodes spaced 1 cm apart and the measurement was done in galvanostatic mode with an ac current of 0.2 mA over a frequency range of 1 MHz to 0.1 Hz. Water uptake of the films were obtained gravimetrically using the equation below. Swollen films were first wiped dry and quickly weighed to obtain the swollen mass ($W_s$). The films were then dried in a vacuum oven at 70 C for over 24 hours and quickly weighed to obtain the dry mass ($W_d$).

$$\text{Water uptake} = \frac{W_s - W_d}{W_d} \times 100\%$$

Gas-Phase Sensing Procedure.

Gas detection measurements were acquired by placing the sensor array device into a custom-built PTFE enclosure with a small gas inlet and outlet and, with the aid of a 64-pin device test clip (3M) and custom-built PTFE spacer, connecting the gold electrodes of the device to a PalmSens EmStat potentiostat with a MUX16 multiplexer. The potentiostat was used to apply a constant potential of 0.100 V across the electrodes, and the current was recorded using PSTrace software (v. 3.0) as the device was exposed to gaseous analytes. For measuring device response to volatile liquid organic compounds, a KIN-TEK gas generator system calibrated for each compound was used to deliver the gaseous analyte diluted in nitrogen gas (2% relative humidity) as the carrier gas at a fixed flow rate. The sensor array was exposed to each analyte for 60 s with at least 180 s of nitrogen flow in between exposures to analyte.

Synthesis of Triptycene Diol T2.

Prior to synthesis, benzoquinone was purified by dissolving the black and yellow powder in dichloromethane, and running a short silica plug. The obtained yellow solution was rotary evaporated under reduced pressure and the yellow powder dried under vacuum at room temperature overnight. 12.1 g benzophenone (0.112 mol) was then mixed with 10.0 g anthracene (0.056 mol) in 70 mL xylenes and refluxed under a nitrogen atmosphere for 4 h. The reaction mixture was cooled to room temperature, filtered, and the residue washed twice with 10 mL toluene. The yellow solid was then recrystallized from xylenes and dried at 60° C. in vacuo overnight to give 11.5 g of the Diels-Alder adduct T1 (72% yield). The crystalline yellow material was then mixed with 150 mL acetic acid and brought to reflux. When the material had completely dissolved, 3 drops 48% hydrobromic acid were added causing the reaction to exotherm considerably. A white precipitate quickly formed and the reaction was refluxed for 1 h. The reaction was allowed to slowly cool to room temperature, and a white crystalline product continued to precipitate. The reaction mixture was filtered, and the white crystalline solid was dried under vacuum at 80° C. overnight to yield 10.9 g triptycene diol T2 (68% yield).

Synthesis of Tip-PEEK.

Potassium carbonate was pulverized into a fine powder in a mortar and pestle and dried in a vacuum oven at 120° C. for at least 3 days. Dimethyl acetamide (DMAc) was dried over 4A molecular sieves for at least 48 h. Triptycene diol was stored in a vacuum oven at 80° C. prior to use. In a two neck round bottom flask equipped with a $N_2$ inlet, magnetic stir bar, and distillation head, 5.727 g triptycene diol (0.0200 mol, 1 eq), 4.364 g 4,4'-difluorobenzophenone (0.0200 mol, 1 eq), and 6.35 g $K_2CO_3$ (0.046 mol, 2.3 eq) was mixed in 100 mL DMAc and 50 mL toluene. The reaction was brought to 150° C. and the toluene distilled under a gentle flow of N$_2$ over 4 h. Then distillation head was removed and replaced with a reflux condenser, and the reaction brought to reflux. Reflux was maintained for 12 h and the hot reaction mixture was poured into stirring water. The water was brought to reflux to remove inorganic salts and then filtered hot. The white polymeric material was then refluxed and filtered alternating between acetone and water at least 3 times each. During this process, it is necessary to grind up the tough polymeric material in a mortar and pestle between wash steps to maximize the surface area available for washing. The resulting white polymeric material was dried in a vacuum oven at 120° C. overnight to yield 8.45 g Trp-PEEK (91% yield)

Synthesis of S-Trp-PEEK.

500 mg Trp-PEEK was dissolved in 10 mL concentrated sulfuric acid while stirring. The reaction was placed in an oil bath a pre-determined temperature and maintained that way for 1 h. The reaction was then precipitated in DI water, centrifuged, and the supernatant discarded. The resulting solids were washed with DI water and then centrifuged five more times. The resulting slightly pink gelatinous solid was then dialyzed against DI water for 48 h. The white gelatinous solid was then lyophilized until dry, resulting in a yellow foam.

Synthesis of Trp-PEEK-NMP.

NMP was dried over 4A molecular sieves for 48 h then distilled under reduced pressure and stored over 4A molecular sieves. Toluene was dried over 4A molecular sieves for 48 h. Potassium carbonate was pulverized into a fine powder in a mortar and pestle and dried in a vacuum oven at 120° C. for at least 3 days. Triptycene diol was stored in a vacuum oven at 80° C. prior to use. In a two neck round bottom flask equipped with a N$_2$ inlet, magnetic stir bar, and distillation head, 9.445 g triptycene diol (0.033 mol, 1 eq), 7.200 g 4,4'-difluorobenzophenone (0.0330 mol, 1 eq), and 10.74 g K$_2$CO$_3$ (0.046 mol, 2.3 eq) was mixed in 100 mL NMP and 25 mL toluene. The reaction was brought to 160° C. and the toluene distilled under a gentle flow of N$_2$ over 4 h. Then distillation head was removed and replaced with a reflux condenser, and the reaction brought to 190° C. This temperature was maintained for 12 h and the hot reaction mixture was poured into stirring acetone. The acetone was brought to reflux and then filtered hot. The white polymeric material was then refluxed and filtered alternating between acetone and water at least 3 times each. The polymer was then purified via Soxhlet extraction with THF. The resulting white polymeric material left in the thimble was dried in a vacuum oven at 120° C. overnight to yield 14.55 g Trp-PEEK-NMP (95% yield).

Synthesis of NO$_2$-Trp-PEEK.

A stock solution of 4:1 v/v conc. HNO$_3$:conc. H$_2$SO$_4$ was made by combining the two acids in a glass container and allowing them to equilibrate and return to room temperature. 6.25 mL of this acid mixture was added slowly to 500 mg Trp-PEEK and the resulting dispersion was allowed to stir at a defined temperature for 1 h. The reaction was then filtered through a glass frit and the solids collected were washed with DI water 3 times. The solids were then redispersed in 40 mL DI water and isolated either by filtration or centrifugation. This was repeated with 40 mL methanol and 40 mL acetone and the solids allowed to dry under vacuum at 80° C.

Synthesis of NH$_2$-Trp-PEEK.

500 mg NO$_2$-Trp-PEEK was dissolved in 20 mL DMF under stirring and 200 mg 10% Pd/C was added. A hydrogen gas balloon was attached via needle and septa to the reaction and a positive pressure of H2 gas was maintained during the course of the reaction. After stirring for 24 h at room temperature (e.g., 20° C.), several scoops of Celite were added to the reaction and mixture was filtered. 3 5 mL portions of DMF were used to wash the solids collected and the DMF solution was isolated. This solution was used directly in the synthesis of both Urea-Trp-PEEK and Thiourea-Trp-PEEK. To isolate NH$_2$-Trp-PEEK, 10 mL of 1 M HCl was added to precipitate the polymer. The polymer was isolated via centrifugation and washed with DI water and methanol, then dried under vacuum at 80° C.

Synthesis of Urea-Trp-PEEK and Thiourea-Trp-PEEK.

Based on the known concentration of NH$_2$-Trp-PEEK from its synthesis, 3 eq. 3,5-trifluoromethyl phenylisocyanate or 3,5-trifluoromethylphenylthioisocyanate were added dropwise to a solution of NH$_2$-Trp-PEEK in DMF. After stirring at room temperature under N$_2$ for 12 h, the solution was poured into water and the polymer was precipitated. The solids were isolated via centrifugation and washed with DI water (3×, 40 mL), and MeOH (3×40 mL) and the dried under vacuum at 80° C.

Example 8—Anion Exchange Membranes

The following example demonstrates the production of triptycene-poly(aryl ether sulfone)s. In some cases, an anion exchange membrane comprises the triptycene-poly(aryl ether sulfone)s.

Anion exchange membranes (AEMs) are generally dielectric materials used in many electrochemical energy storage devices such as fuel cells, batteries and more. These membranes may act as a barrier to electrons and a conductor to anions to maintain charge neutrality during the operation of electrochemical energy storage devices.

Triptycene-Poly(aryl ether sulfone) (trpPAES) and its copolymers with bisphenol

Figure 20:
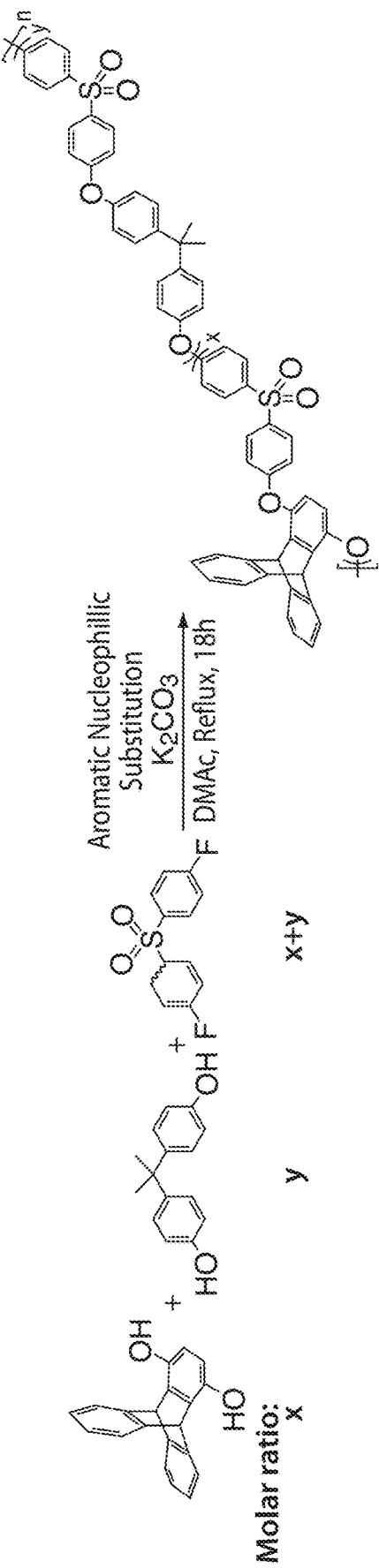
FIG. 20 shows the synthesis of a trpPAES using aromatic nucleophilic substitution (S$_N$Ar), according to one set of embodiments.

A were synthesized using SNAr chemistry as shown in FIG. 20. The molar ratio of fluorine on the bis(4-fluorophenyl)sulfone and the total alcohol functional groups on triptycene diol and bisphenol A was controlled carefully to maximize the molecular weight of the polymer. Ratio of triptycene diol and bisphenol A was also varied to make random copolymers with controlled properties. Without wishing to be bound by theory, increasing the number of the bulky and out-of-plane triptycene group generally increased the glass transition temperature and decreases the skeletal density of the polymer. Copolymers of different amount of triptycene group are abbreviated as trp-PAES(x,y) where x and y represent the molar ratio of the triptycene diol and bisphenol A as shown in FIG. 20. For example, trpPAES(1, 0) has no bisphenol A added and trp-PAES(1,1) has equal amount of triptycene diol and bisphenol A.

Resulting base polymers have a number average molecular weight range from 30-60 kg/mol with a polydispersity range of 1.4-1.5 as measured using gel permeation chromatography with polystyrene as an internal standard. The polymers were very soluble in basic organic solvents such as tetrahydrofuran, chlorinated solvents and high boiling solvents such as dimethylacetamide and N-methyl pyrrolidinone.

Figure 21:
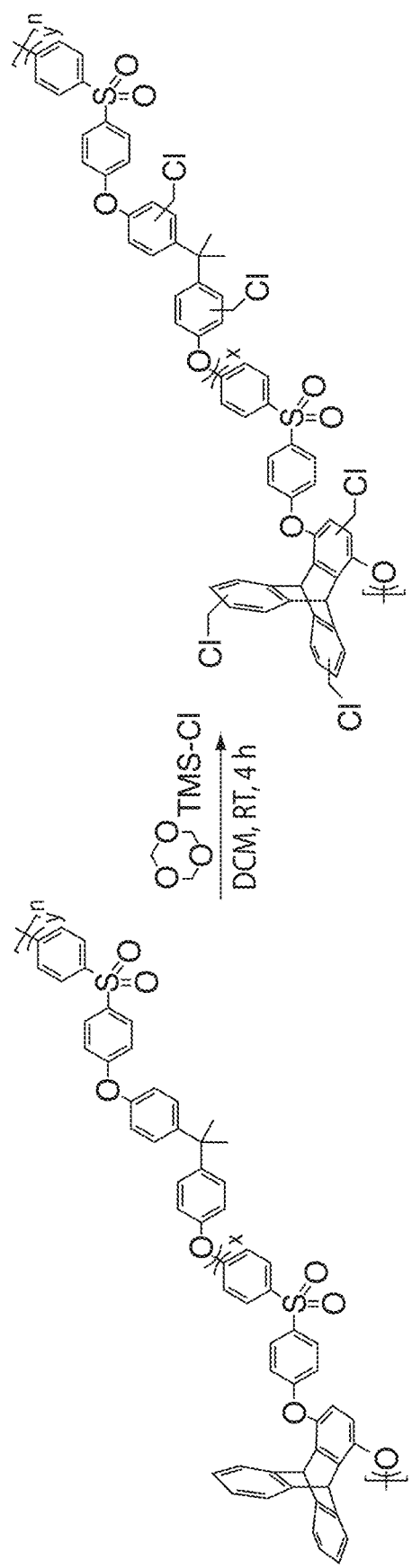
FIG. 21 shows the synthesis of chloromethylated trp-PAES (Cl-trpPAES), according to one set of embodiments.
Figure 22:
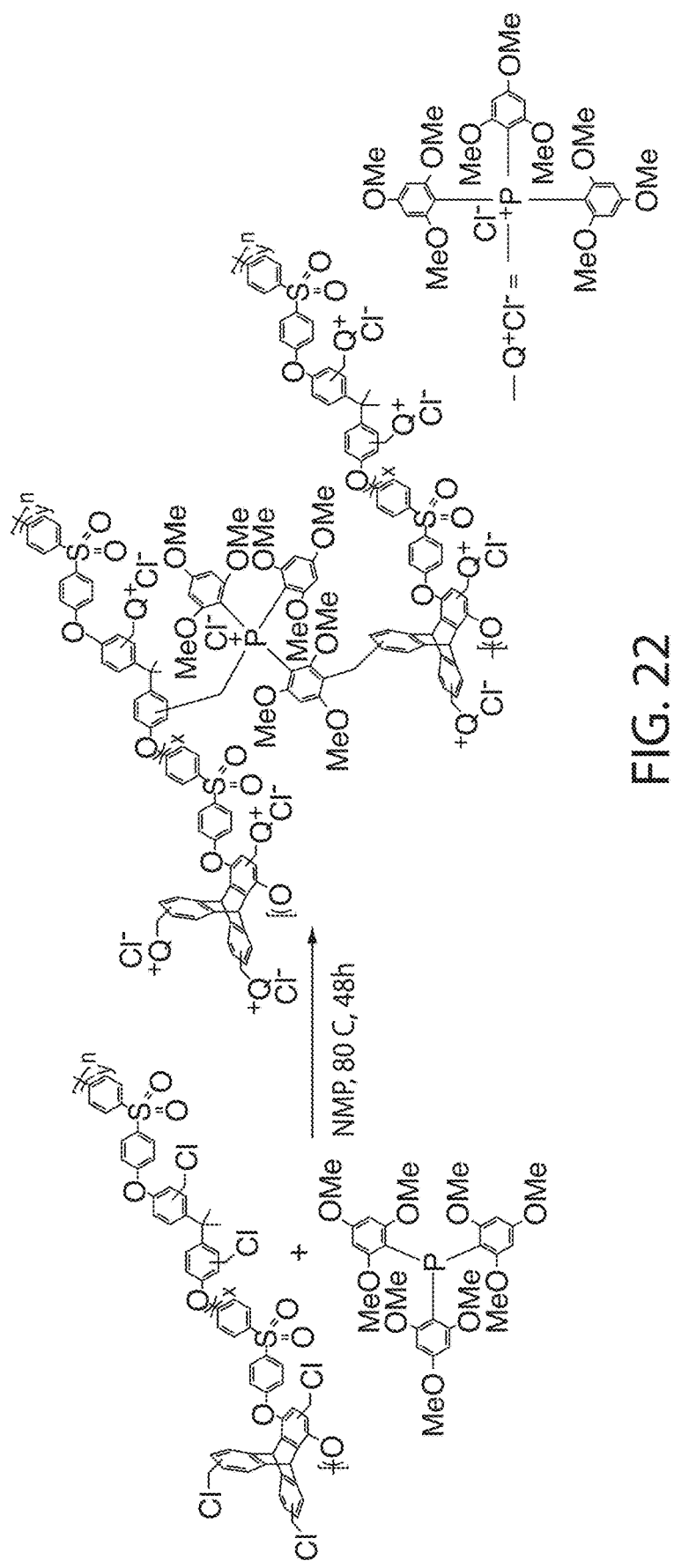
FIG. 22 shows the synthesis of quaternized phosphonium trp-PAES (QP-trp-PAES), according to one set of embodiments.

TrpPAES were chloromethylated using a variant of the Blanc reaction (FIG. 21). Polymers were first dissolved in dichloromethane with trioxane and chlorotrimethylsilane. Tin(IV) chloride was then added dropwise while stirring the reaction at high speed and the reaction mixture was left to stir at room temperature for 24 hours to form chloromethylated TrpPAES (Cl-TrpPAES). The reaction was then quenched by precipitating the polymer in ethanol. The polymer was filtered and washed with ethanol.

Without wishing to be bound by theory, crosslinking may occur during the reaction if the concentration of the polymer in the reaction mixture is too high. Crosslinked products are generally no longer soluble and may hinder membrane formation. In order to remove the crosslinked products, the polymer was dissolved in NMP, filtered and reprecipitated in ethanol twice before drying in the vacuum oven at 70° C. overnight. The degree of functionalization was controlled between 0.5 to 0.8 chloromethyl group to each reactive phenyl ring.

The Cl-trpPAES were then quaternized into phosphonium, imidazolium and ammonium derivatives. For the phosphonium derivative, Cl-trpPAES was mixed with tris-(2,4,6-trimethoxyphenyl)phosphine in NMP at 80° C. to form the phosphonium derivative trp-PAES (QP-TrpPAES). Crosslinking may occur in the membrane for enhanced mechanical properties when, for example, the ratio of phosphine to chloromethyl group is controlled.

Figure 23:
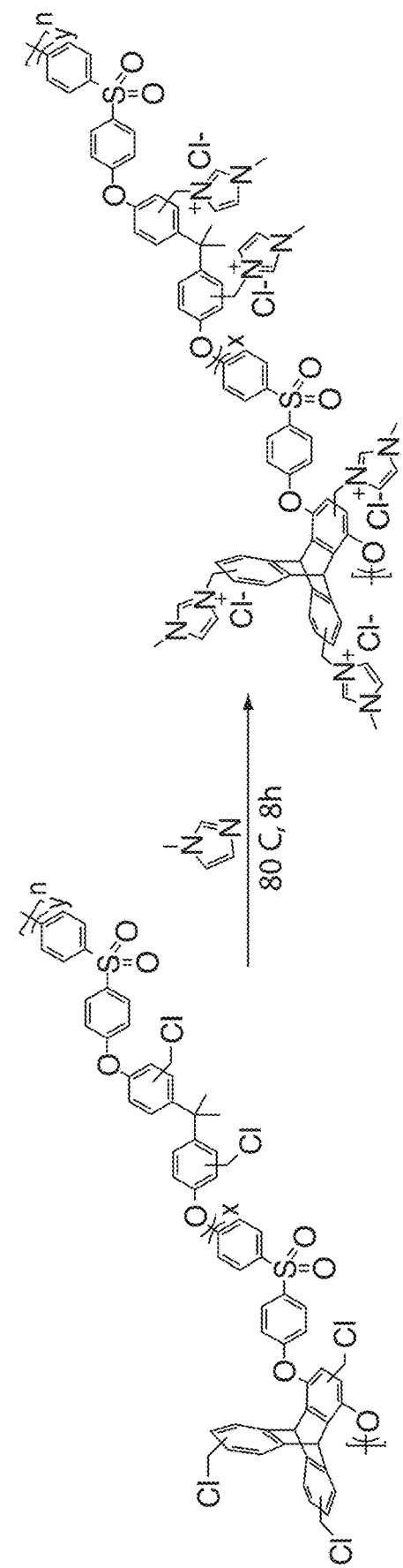
FIG. 23 shows the synthesis of imidazolium trp-PAES (IM-trpPAES), according to one set of embodiments.
Figure 24:
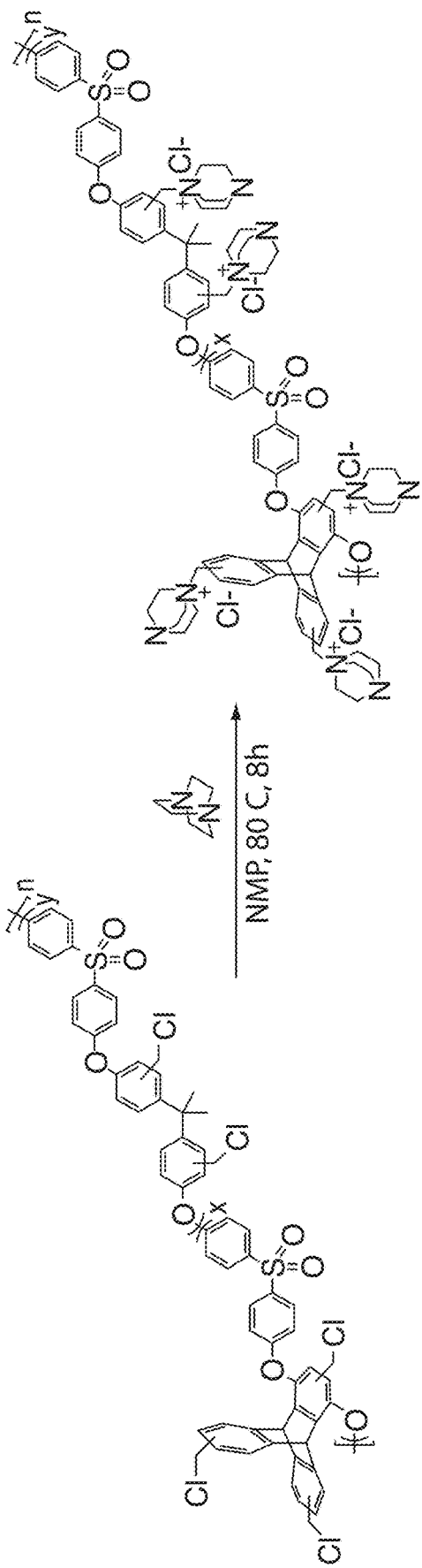
FIG. 24 shows the synthesis of 1,4-diazabycyclo[2.2.2] octane (DABCO) trp-PAES (DABCO-trpPAES), according to one set of embodiments.

Cl-trpPAES was converted to imidazolium derivative (IM-trpPAES) by first dissolving Cl-trpPAES in 1-methylimidazole and stir the mixture at 80° C. for 18 hours (FIG. 23). The reaction was precipitated in acetone, filtered and dried in the vacuum oven at 70° C. IM-trpPAES was then dissolved in NMP and cast into a membrane.

The quaternary ammonium derivative was synthesized by first dissolving Cl-trpPAES in DMAc with excess 1,4-diazabycyclo[2.2.2]octane (DABCO). The mixture was left to stir at 80° C. for 18 hours before precipitating in acetone to form the DABCO derivative (DABCO-trpPAES). Other quaternary ammonium salts can also be made using similar procedures. DABCO was chosen in this case because of its stability to bases.

The QP-trpPAES, Im-trpPAES and DABCO-trpPAES membranes were then treated in KOH solution to induce an ion exchange between chloride and hydroxide ion to yield hydroxide ion exchange membrane.

Figure 25:
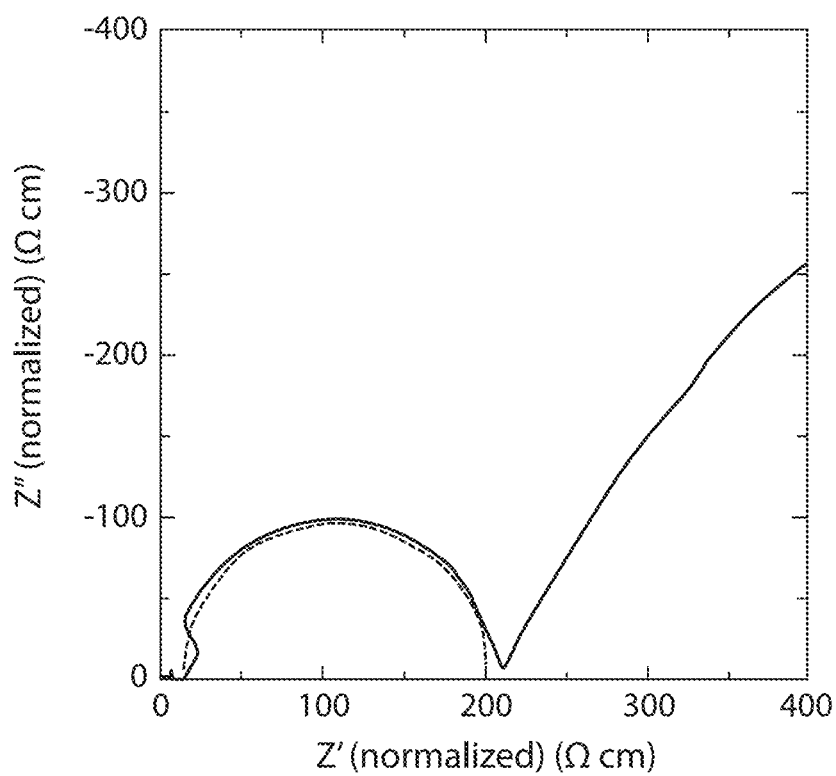
FIG. 25 is a Nyquist plot of a hydroxide ion membrane, according to one set of embodiments.

The hydroxide ion membranes were first prepared by rinsing and soaking in deionized water to remove excess potassium hydroxide. The membrane was then tested for hydroxide ion conductivity in deionized water by electrochemical impedance spectroscopy. In-plane hydroxide conductivity was obtained with a four probe setup that is coupled to an impedance analyzer (Solartron 1260) with an electrochemical interface (Solartron 1287). Measurement was done with a current at 0 A with an amplitude of 0.01 mA over the frequency of 1 MHz to 1 Hz. Hydroxide ion resistance is extracted from the high frequency intersect between the plot and the real axis in the Nyquist plot (FIG. 25). In-plane conductivity, a is calculated from the resistance using the following equation:

$$\sigma = \frac{l}{RA}$$

where l is the length between the electrode, R is the resistance obtained from the Nyquist plot and A is the cross sectional area of the membrane. A typical Nyquist plot for the membrane is as shown in FIG. 25.

By incorporating the bulky triptycene moiety in the polymer, the glass transition temperature of the polymer increased, resulting in a brittle membrane at room temperature when there is more triptycene diol then bisphenol A used in the polymerization. Membranes based on trp-PAES (1,0) and trp-PAES(4,1) were brittle at room temperature and cracked upon casting.

Figure 26:
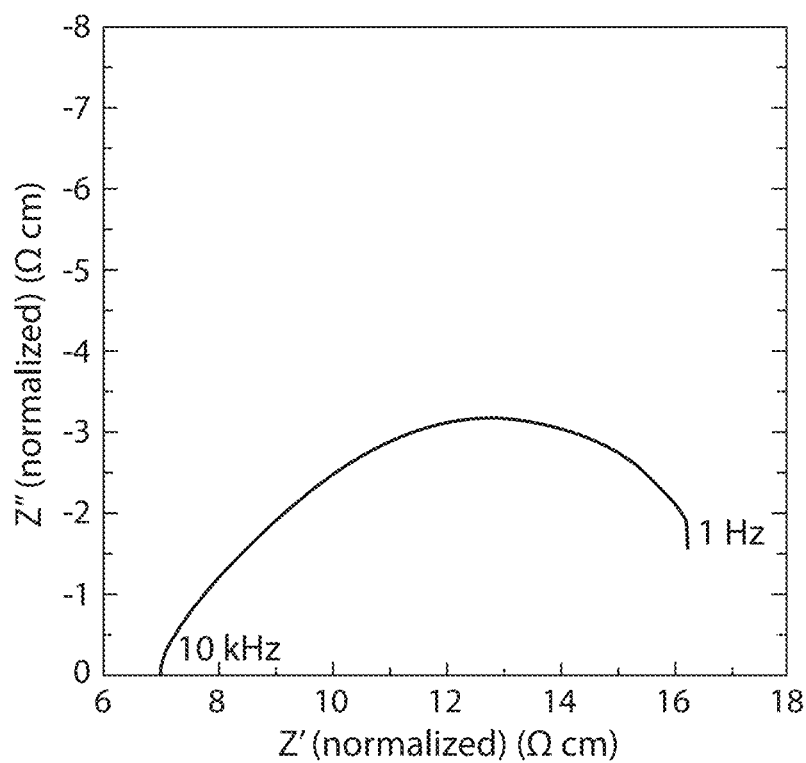
FIG. 26 is a Nyquist plot of QP-trpPAES(1,1) in water at 20° C., according to one set of embodiments.

Membranes made with QP-trp-PAES(1,1) were measured (FIG. 26) and the hydroxide ion conductivity was calculated to be 120 mS/cm at 20° C.

Example 9—Sulfonated trpPEEK as Proton Exchange Membranes

Figure 27:
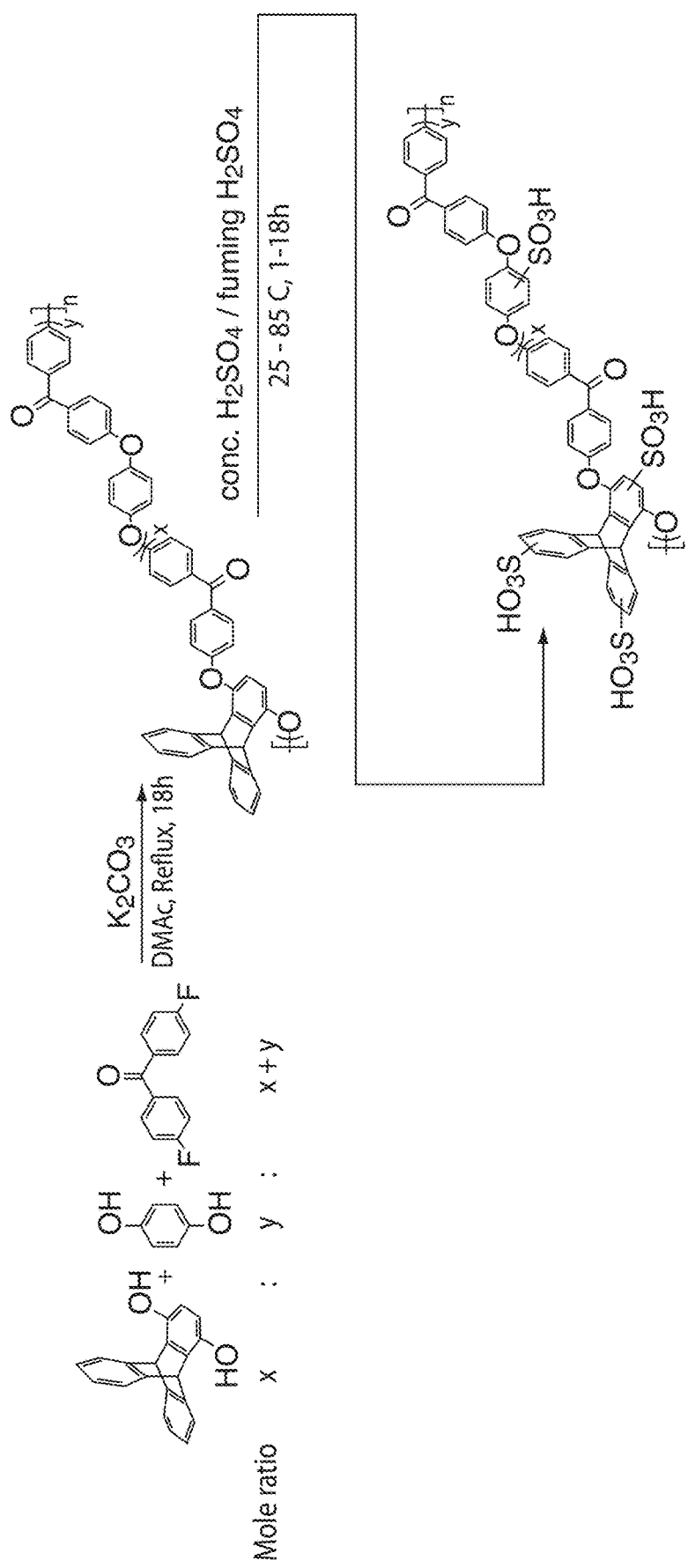
FIG. 27 shows the synthesis of S-trpPEEK(x,y) copolymers where x and y denotes the mole ratio of triptycene moiety to hydroquinone, according to one set of embodiments.
Figure 28:
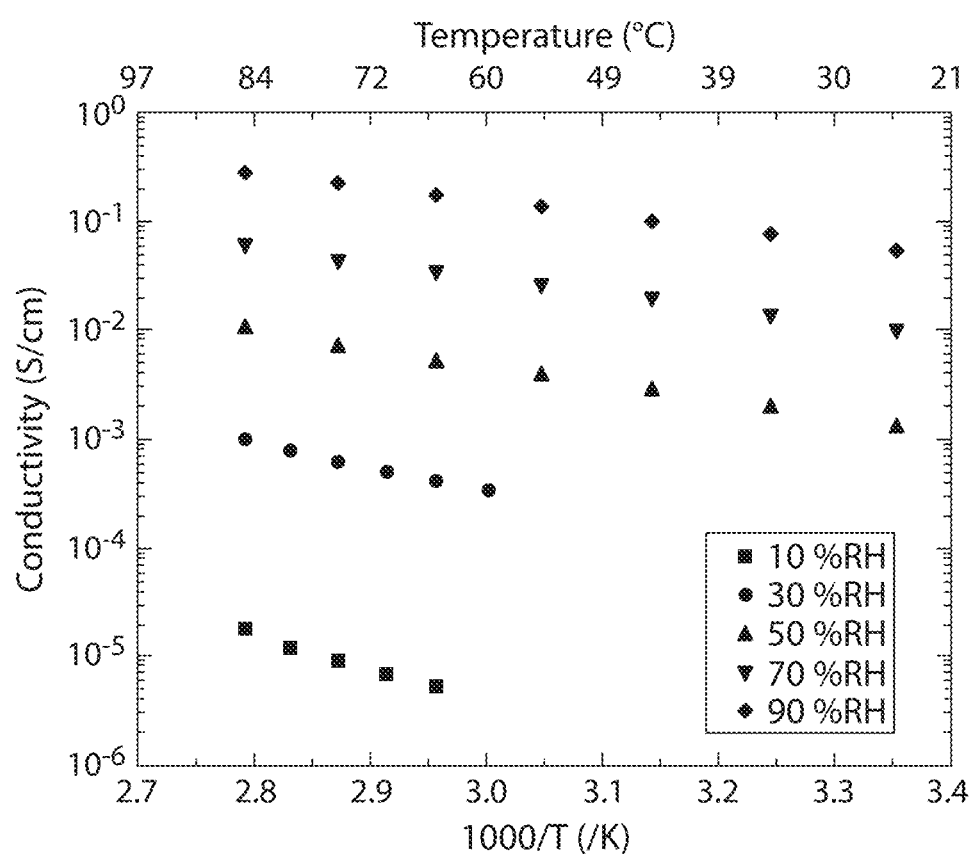
FIG. 28 is a plot of proton conductivity for a S-trpPEEK (1,0) membrane, according to one set of embodiments.

Sulfonated trpPEEKs (S-trpPEEK(x,y)) (FIG. 27) showed a range of conductivities from $10^{-6}$ S/cm to 0.27 S/cm at various temperature and relative humidity as shown in FIG. 28. Proton conductivity of the membranes generally followed an Arrhenius relation with activation energies decreasing with increasing relative humidity. Lower activation energies could, for example, enable easier proton transport and increase overall proton conductivity.

Figure 29:
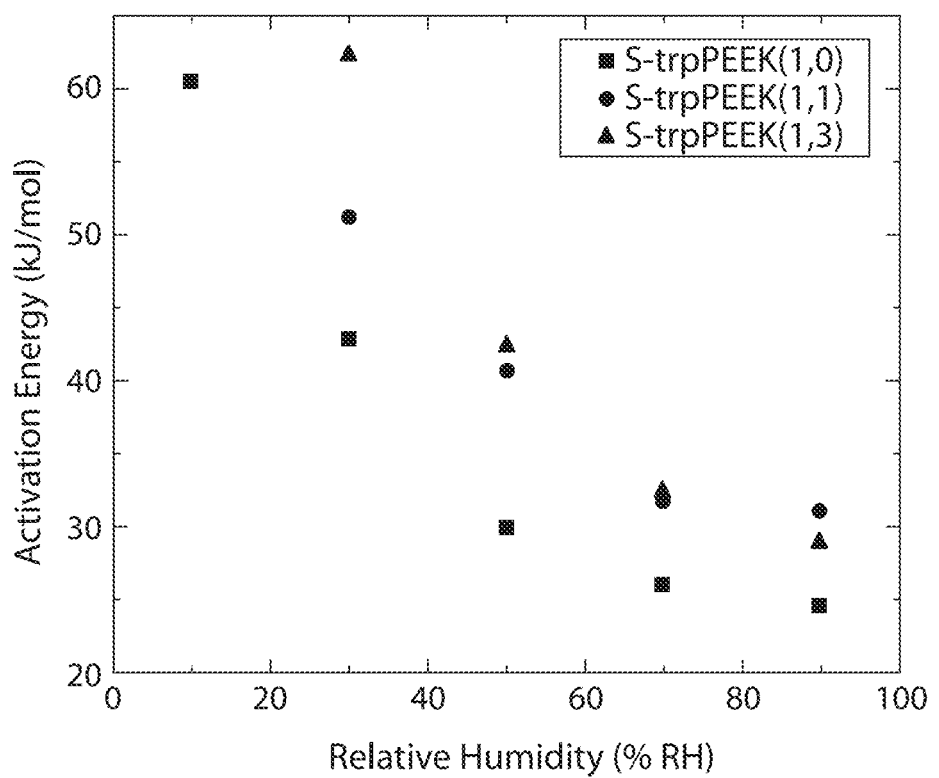
FIG. 29 is a plot of activation energy vs relative humidity, according to one set of embodiments.

As relative humidity increased, water content trapped in the membrane increased and enhanced proton conductivity (FIG. 29). It was also observed that as the number of triptycene group in the polymer increased, the activation energies decreased more rapidly with increasing relative humidity. Without wishing to be bound by theory, by increasing the number of bulky triptycene groups in the base polymer, more free volume would be present in the membrane, improving water adsorption at lower humidity. As such, since water molecules are generally related to enhanced proton conductivity, the higher water adsorption at low humidity may help lower the activation energy and improve proton conductivity.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:
1. A composition, comprising:
 a first polymer having a backbone, the backbone comprising an iptycene-based compound positioned within the backbone, and an aryl ether-based compound; and
 a second polymer different than the first polymer, wherein the first polymer has a structure as in Formula (I):

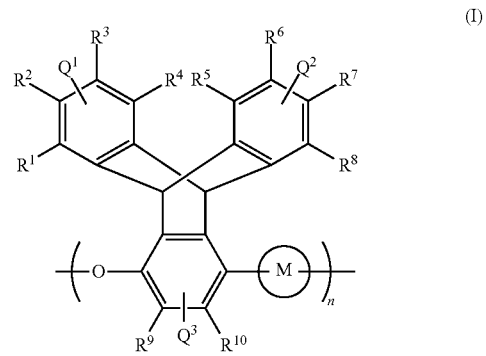

wherein:
$R^1$-$R^{10}$ can be the same or different and are hydrogen, halo, hydroxyl, amino, alkyl, heteroalkyl, alkenyl, alkynyl, aryl, heteroaryl, heterocyclyl, urea, thio-urea, imidizolium, phosphonium, diazonium, sulfate, nitro, nitrile, or a carbonyl group, any of which is optionally substituted, or, any two adjacent groups of $R^1$-$R^{18}$ can be joined together to form an optionally substituted ring,
$Q^1$-$Q^3$ can be the same or different and are absent, a nitrogen containing compound, a sulfur containing compound, a urea containing compound, a thiourea containing compound, and/or a fluorine containing compound, any of which is optionally substituted,
n is an integer greater than 1, and
M is selected from the following aryl ether compounds:

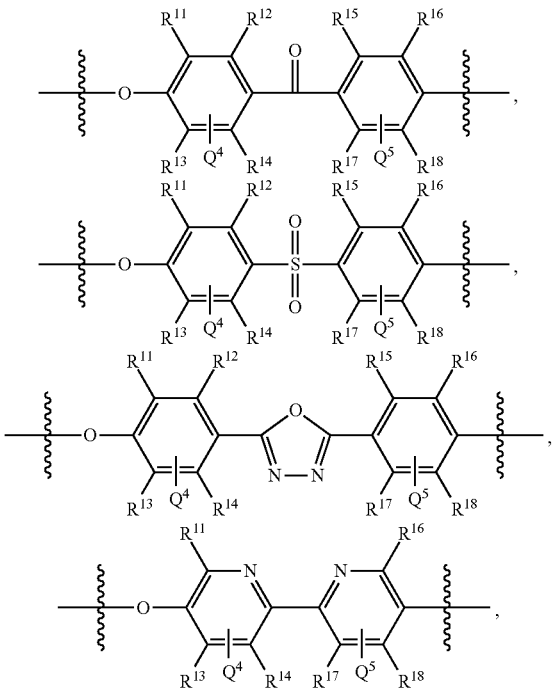

wherein:
$R^{11}$-$R^{18}$ can be the same or different and are hydrogen, halo, hydroxyl, amino, alkyl, heteroalkyl, alkenyl, alkynyl, aryl, heteroaryl, heterocyclyl, urea, thio-urea, imidizolium, phosphonium, diazonium, sulfate, nitro, nitrile, or a carbonyl group, any of which is optionally substituted, or, any two adjacent groups of $R^1$-$R^{18}$ can be joined together to form an optionally substituted ring, and $Q^4$-$Q^5$ can be the same or different and are absent, a nitrogen containing compound, a sulfur containing compound, a urea containing compound, a thiourea containing compound, and/or a fluorine containing compound, any of which is optionally substituted.

2. A composition as in claim 1, wherein the second polymer is selected from the group consisting of poly(THF), polyamide, polyurethane, poly(ethylene glycol), and poly(dimethylsiloxane).

3. A composition as in claim 1, wherein the second polymer has a glass transition temperature less than 25° C.

4. A composition as in claim 1, wherein the nitrogen containing compound is selected from the group consisting of $NO_2$, $NH_2$, and diazonium.

5. A composition as in claim 1, wherein the sulfur containing compound is $SO_3H$.

6. A composition as in claim 1, wherein n is between about 2 and about 1,000.

7. A composition as in claim 1, wherein the first polymer having a backbone has a number average molecular weight ranging between about 400 Da and about 400000 Da.

8. A device comprising, a composition as in claim 1.

9. A device as in claim 8, wherein the device comprises a proton exchange membrane comprising the composition as in claim 1.

10. A device as in claim 8, wherein the device comprises a cation exchange membrane comprising the composition as in claim 1.

11. A device as in claim 8, wherein the device comprises an anion exchange membrane comprising the composition as in claim 1.

12. A device as in claim 8, wherein the device comprises an ion exchange membrane that functions in an anhydrous environment.

13. A device as in claim 8, wherein the device is a fuel cell.

14. A device as in claim 8, wherein the device comprises two conductive electrodes.

15. A device as in claim 8, wherein the device comprises SWCNTs.

16. A device as in claim 8, wherein the device is a chemiresistive sensor.

17. A device as in claim 8, wherein the device absorbs chemical odors.

18. A device as in claim 17, wherein the device absorbs aldehydes, ketones, esters, thiols, thioethers, and/or amines.

19. A device as in claim 8, wherein the device comprises metal ions.

20. A device as in claim 8, wherein the device comprises catalytic metal centers.

21. A device as in claim 8, wherein the device is a colorimetric sensor.

22. A device as in claim 8, wherein the device is a fluorescent sensor.

23. A composition as in claim 1, wherein the nitrogen containing compound is selected from the group consisting of $NO_2$, $NH_2$, diazonium, thiourea, imidazolium, and organic diarylazo chromophore.

24. A composition, comprising:
a polymer having a backbone, the backbone comprising an iptycene-based compound positioned within the backbone, and an aryl ether-based compound;
wherein the polymer has a structure as in Formula (I):

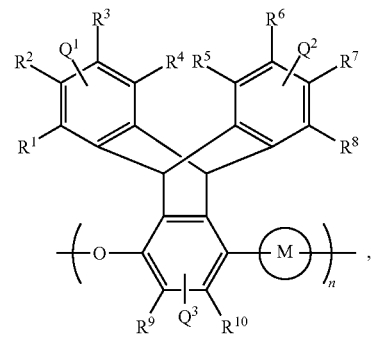

wherein:
$R^1$-$R^{10}$ can be the same or different and are hydrogen, halo, hydroxyl, amino, alkyl, heteroalkyl, alkenyl, alkynyl, aryl, heteroaryl, heterocyclyl, urea, thio-urea, imidizolium, phosphonium, diazonium, sulfate, nitro, nitrile, or a carbonyl group, any of which is optionally substituted, or, any two adjacent groups of $R^1$-$R^{18}$ can be joined together to form an optionally substituted ring, $Q^1$-$Q^3$ can be the same or different and are absent, a nitrogen containing compound, a sulfur containing compound, a urea containing compound, a thiourea containing compound, and/or a fluorine containing compound, any of which is optionally substituted, n is an integer greater than 1, and M is:

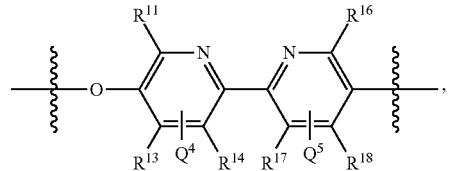

wherein:
$R^{11}$, $R^{13}$, $R^{14}$, and $R^{16}$-$R^{18}$ can be the same or different and are hydrogen, halo,
hydroxyl, amino, alkyl, heteroalkyl, alkenyl, alkynyl, aryl, heteroaryl, heterocyclyl, urea, thio-urea, imidizolium, phosphonium, diazonium, sulfate, nitro, nitrile, or a carbonyl group, any of which is optionally substituted, or, any two adjacent groups of $R^1$-$R^{18}$ can be joined together to form an optionally substituted ring, and $Q^4$-$Q^5$ can be the same or different and are absent, a nitrogen containing compound, a sulfur containing compound, a urea containing compound, a thiourea containing compound, and/or a fluorine containing compound, any of which is optionally substituted.

* * * * *